(12) United States Patent
Buehler

(10) Patent No.: US 8,276,505 B2
(45) Date of Patent: Oct. 2, 2012

(54) FOOD PREPARATION SYSTEM

(76) Inventor: David Benjamin Buehler, Provo, UT (US)

( * ) Notice: Subject to any disclaimer, the term of this patent is extended or adjusted under 35 U.S.C. 154(b) by 888 days.

(21) Appl. No.: 11/061,024

(22) Filed: Feb. 18, 2005

(65) Prior Publication Data

US 2005/0193901 A1    Sep. 8, 2005

Related U.S. Application Data

(60) Provisional application No. 60/545,863, filed on Feb. 18, 2004.

(51) Int. Cl.
*A47J 31/00* (2006.01)

(52) U.S. Cl. ............... 99/326; 99/331; 99/334; 99/348; 99/352; 99/357; 99/423; 99/443 C; 99/486

(58) Field of Classification Search ............ 99/326, 99/331, 386, 325, 334, 443 C, 486, 423, 357, 99/348, 352; 700/211; 901/1, 7
See application file for complete search history.

(56) References Cited

U.S. PATENT DOCUMENTS

| | | | | |
|---|---|---|---|---|
| 5,132,914 A * | 7/1992 | Cahlander et al. | ............ | 700/211 |
| 5,228,382 A * | 7/1993 | Hayashi et al. | ................ | 99/328 |
| 5,386,762 A * | 2/1995 | Gokey | ............... | 99/326 |
| 6,626,190 B2 * | 9/2003 | Durth et al. | ................ | 134/22.18 |
| 6,843,166 B1 * | 1/2005 | Li | ................... | 99/327 |
| 6,869,633 B2 * | 3/2005 | Sus et al. | ....................... | 426/438 |
| 7,001,626 B2 * | 2/2006 | Sands et al. | ................... | 426/231 |
| 7,174,830 B1 * | 2/2007 | Dong | ............... | 99/334 |
| 7,241,977 B2 * | 7/2007 | Friedl et al. | ................ | 219/411 |
| 2004/0173103 A1 * | 9/2004 | Won | ............... | 99/326 |

* cited by examiner

*Primary Examiner* — Reginald L Alexander
(74) *Attorney, Agent, or Firm* — Workman Nydegger

(57) ABSTRACT

An automated food preparation system is described. It allows precise, automated control of the food preparation process, and has the ability to perform an automated cleanup. It comprises at least one manipulator to process and move ingredients, a control system, an autonomously accessible ingredient storage system, and at least one cooking receptacle.

22 Claims, 49 Drawing Sheets

FOOD PREPARATION SYSTEM

This application claims the benefit of the provisional patent application No. 60/545,863 titled "Food Preparation System", which was filed on Feb. 18, 2004, which is hereby included by reference.

FIELD OF THE INVENTION

The field of the invention is in automated cooking devices.

BACKGROUND OF THE INVENTION

There are a number of prior art devices. They focus mainly on devices that can prepare a single food (for example, bread, ice cream, French fries, etc.) or provide automation for a fast food restaurant (a hamburger assembly robot).

For example, U.S. Pat. No. 5,363,746 describes an automated food making system for ice cream, custards, and similar foods.

U.S. Pat. No. 6,427,583 describes a system for automatically frying food.

U.S. Pat. No. 5,839,356, among others, describes automatically device for baking bread.

The limitation of the prior art devices is that they only handle a small portion of the tasks involved in preparing food. They require close supervision by a human operator. They also require the manual cleanup and are limited in the number of different dishes they can prepare.

What is needed is a device that can be used at home or in a restaurant, that operates almost completely autonomously, that can prepare a wide variety of dishes, and that can also clean itself. Such a machine could bring back home-cooked, made-from-scratch food to the modern table and allow people to experience a wider variety of different food on a daily basis. This would be much healthier food than the current mass-produced, industrial-prepared, pre-packaged food people so often consumed at present.

People spend a lot of time in the kitchen and a lot of money at restaurants. They also spend a great deal of money on prepared food such as frozen pizza, frozen dinners, etc. Much of this factory-made, fast food is not as nutritious or flavorful as homemade food or food prepared from scratch in a fine restaurant. The kitchen takes up a lot of space in a house and is expensive to build and equip. People who do cook at home spend a great deal of time going to the grocery store to replenish food supplies.

What is needed is an automated cooking device that can prepare almost any dish and replace most of the equipment in a modern kitchen, from the pantry to the stove, and handles the re-ordering and storing of ingredients.

SUMMARY OF INVENTION

The present invention consists of an automated food preparation system (FPS) for preparing food that can prepare almost any dish and automatically cleans up after itself. It potentially replaces all appliances and cookware in a kitchen including the pantry areas and refrigerator.

The device has a food storage area, where ingredients are stored. These ingredients may be supplied preprocessed and ready to go from grocery store, such as chicken cut into pieces. Stored ingredients may also consist of flours, grains, pasta, beans, sugar and other dry ingredients in containers. The system has a refrigerated food storage area for ingredients such as meat, dairy products, juice, and other items requiring refrigeration.

In the preferred embodiment, the cooking will be accomplished primarily in a number of cooking receptacles. These are similar to pots fixed in place with built-in heating capability. The cooking receptacles also have the capability to cool food, allowing them to keep food cool for long-periods turning the cooking receptacle into a refrigerated storage receptacle. The cooking receptacle can also keep the food at a desired temperature for doing things like fermenting a sourdough starter or letting a yeast-based dough rise.

In one embodiment, the cooking receptacle is emptied from the top, using a pumping system or a spatula or scoop. In another embodiment, the cooking receptacle is configured to pivot allowing it to be emptied by pouring so the food contained may be emptied into another container. The cooking receptacle is insulated so the heat supplied for cooking is used efficiently. In another embodiment, the cooking receptacle has a removable liner allowing the primary manipulator to lift out the liner and transfer the contents to another location.

In one embodiment, the cooking receptacles have insulated lids. The lid is equipped with a heating element, a cooking fume collection and exhaust system, and a conduit to provide steam or water to the inside of the cooking receptacle. This allows the cooking receptacle to be used with the lid closed, and prevents spatter and other drips from landing in the cooking receptacle which allows other cooking receptacles to be cleaned while dishes are cooking without cleaning water splashing into the food.

The cooking system of the present invention has the potential to eliminate almost all food packaging material. It allows trouble-free healthy cooking enabling homemade dishes made from scratch to be available all the time. It will be less expensive than eating at restaurants but produces restaurant quality or better food.

The control system can be upgraded easily with new programming. The recipes may evolve quickly, and improved versions if existing recipes will also quickly evolve by trading over the internet and genetic algorithm style evolution. The system gives the users almost unlimited menu choices from which to choose, limited only be the ingredients on hand and certain dishes that require a degree of human hand-eye coordination that surpasses the capabilities of the system. People using the FPS will eat much higher quality food and will not have to resort to frozen food or other mass-produced, pre-processed food items. The cooking process will be entertaining to watch through an observation window in the FPS cabinet and over video feed.

The device will be more space-efficient than a traditional kitchen, and will generate more useable space in the house for other purposes. It allows for very precise control of the cooking process, allowing high degree of reproducibility and consistency resulting in high-quality cooking.

It allows the system to be restocked in a very efficient manner from an automated resupply truck. Restocking can even be done through small opening on the side of the house, so no human involvement would be required. It eliminates the expensive packaging which make up a sizable portion of current grocery bills, which will result in cheaper food.

It could be shared by a number of people living in a duplex or apartment complex, with built-in software to manage personal ingredients and handle accounting for communal ingredients used. It may be used in restaurants to greatly reduce the cost or restaurant food and greatly increase the selection of dishes available.

It will be easy for people on special diets to use because they can work with any subset of ingredients. It facilitates the quick transfer of new recipes and food ideas via email around the country and world. People who find a new recipe or cooking program for the device can forward it to all of their friends to try out the next day. The overall system is made highly reliable through the use of solid state power electronics throughout.

Figure 4A:
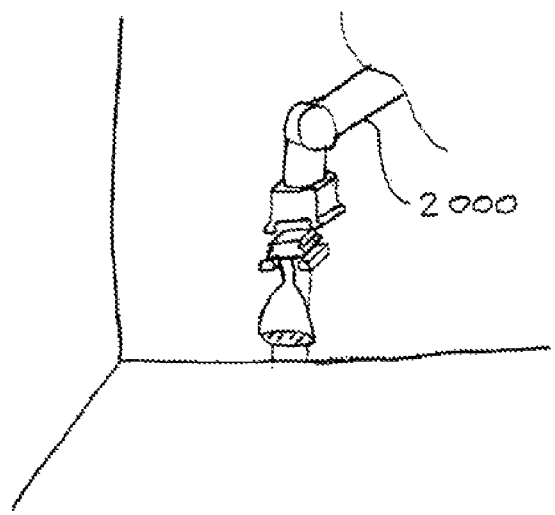
Figure 4B:
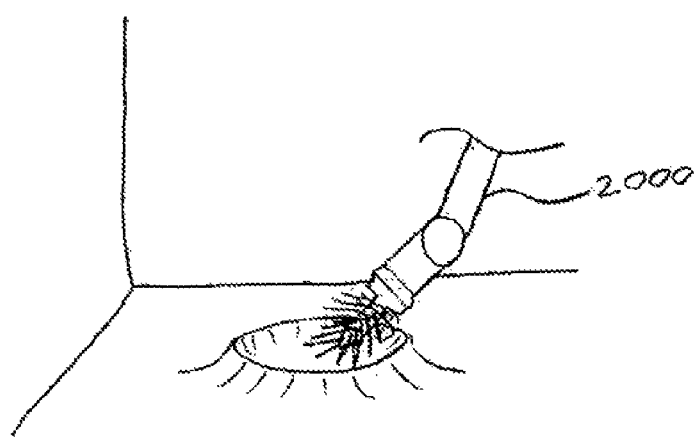
Figure 4C:
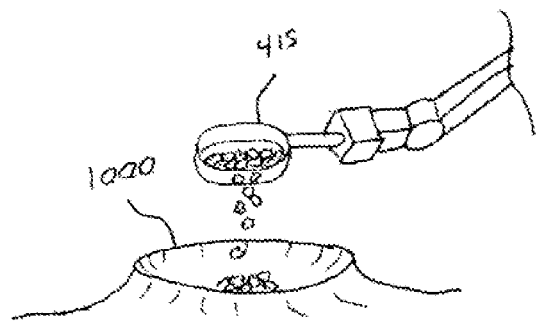
Figure 4D:
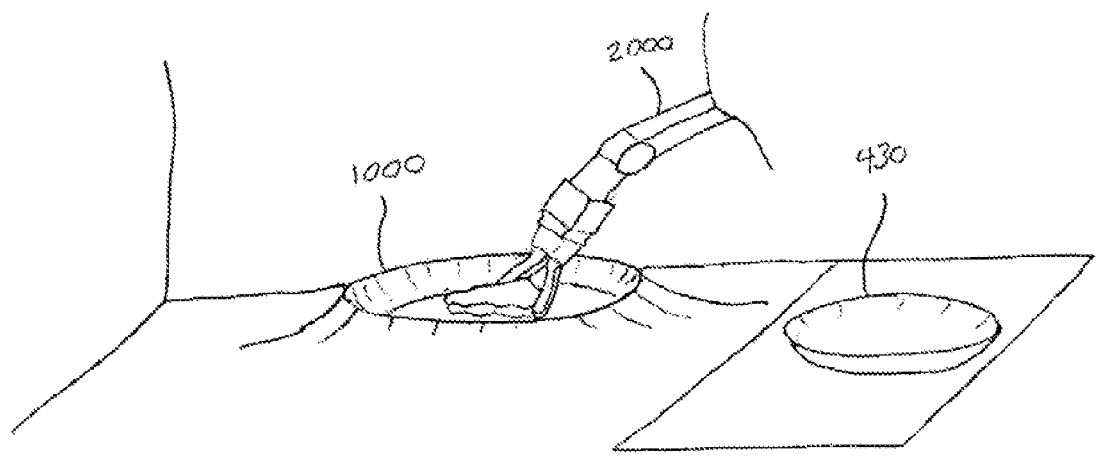
Figure 4E:
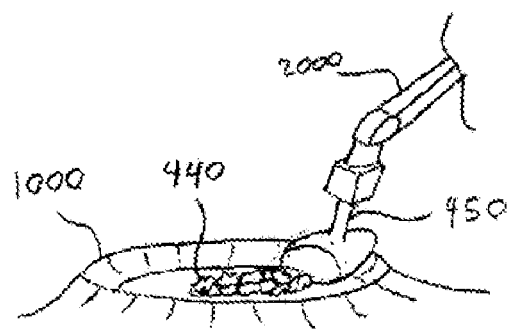
Figure 4F:
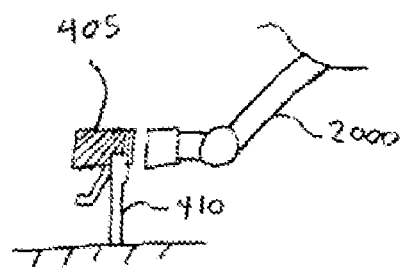

FIG. 4a is a pictorial view of the primary manipulator.
FIG. 4b is a pictorial view of the primary manipulator.
FIG. 4c is a pictorial view of the primary manipulator.
FIG. 4d is a pictorial view of the primary manipulator.
FIG. 4e is a pictorial view of the primary manipulator.
FIG. 4f is a pictorial view of the primary manipulator.

Figure 5:
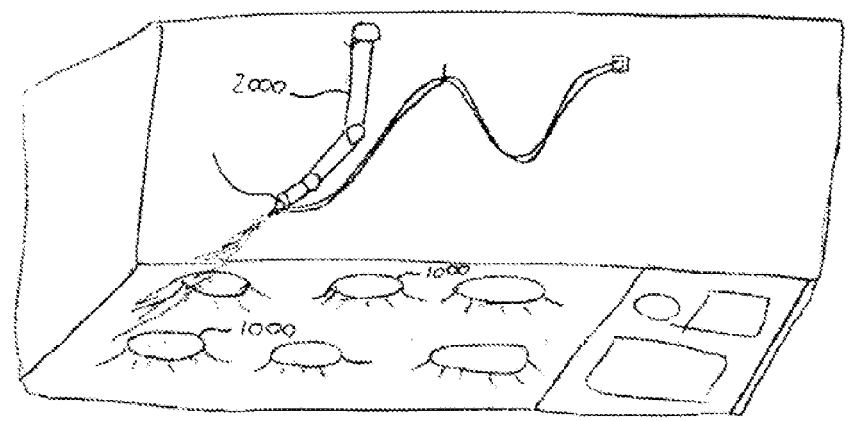

FIG. 5 is a pictorial view of the primary manipulator cleaning the cooking area.

Figure 6:
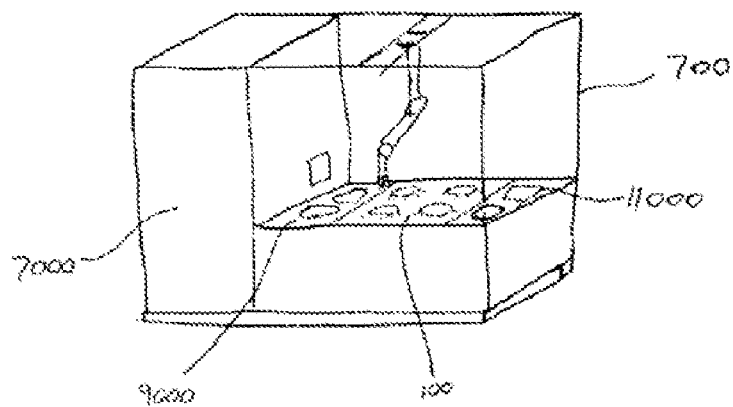

FIG. 6 is pictorial view of a FPS consisting of a monolithic module.

Figure 7A:
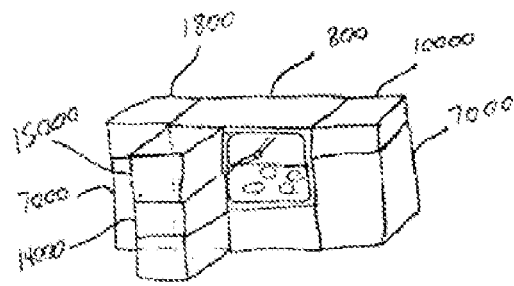

FIG. 7a is a pictorial view of a FPS consisting of a number of attachable module.

Figure 7B:
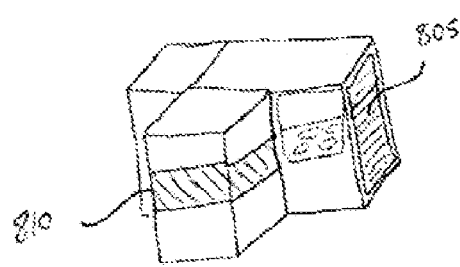

FIG. 7b is a pictorial view of a removable panel (805) on a central cooking module (100) to which another module may be attached.

Figure 8:
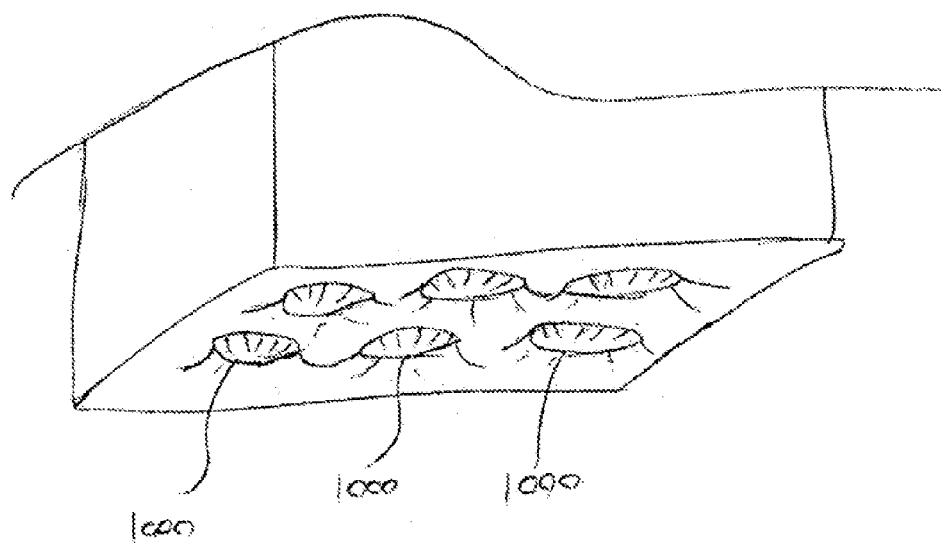
Figure 9A:
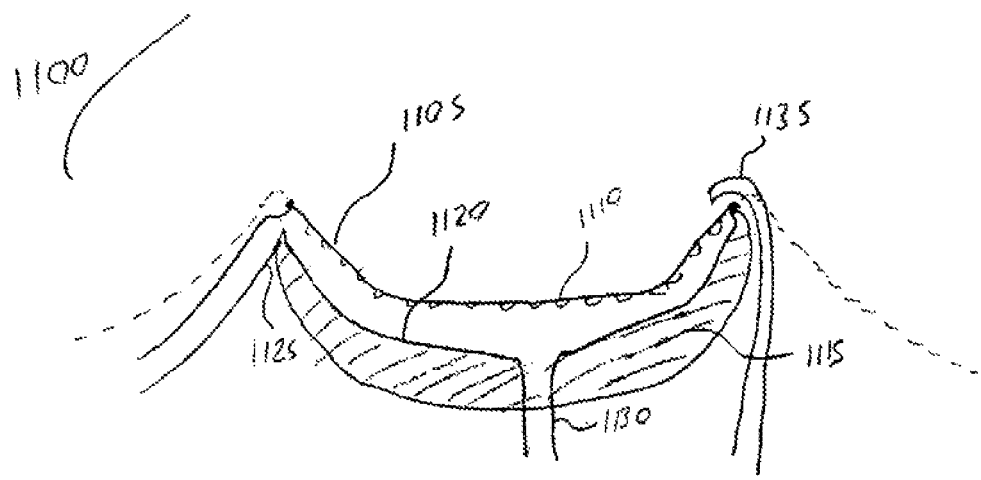

FIG. 8 is a pictorial view of several cooking receptacles.
FIG. 9a is a cross section of a fixed-in-place cooking receptacle (1100).

Figure 9B:
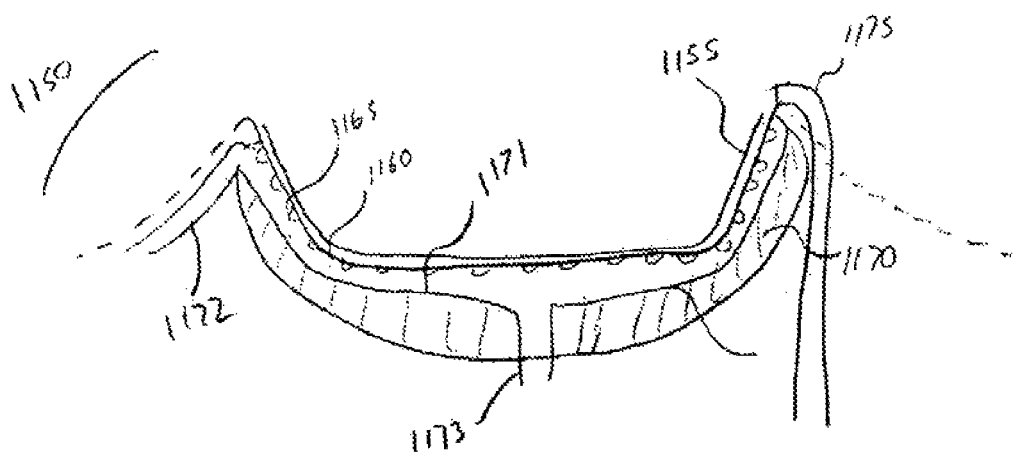

FIG. 9b is a cross section of a removable-liner cooking receptacle.

Figure 9C:
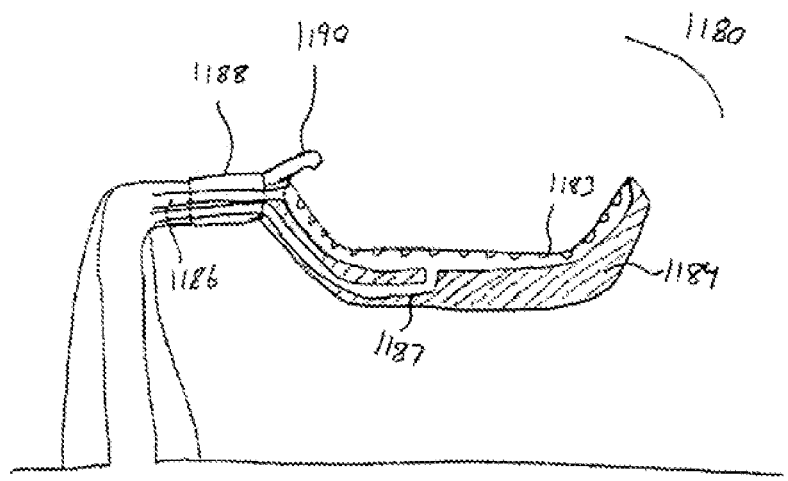
Figure 10A:
Figure 10B:
Figure 10C:

FIG. 9c is a cross section of a tiltable cooking receptacle.
FIG. 10a is a cross section of a flat cooking receptacle.
FIG. 10b is a cross section of a deeper cooking receptacle.
FIG. 10c is a cross section of a round bottom cooking receptacle.

Figure 11A:
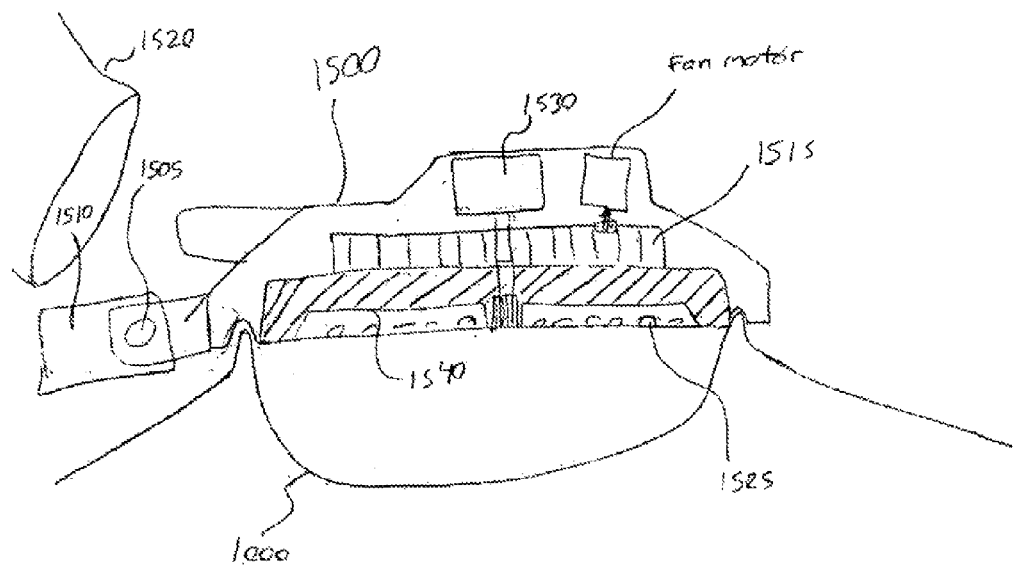
Figure 11B:
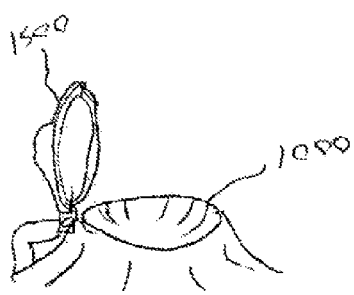
Figure 11C:
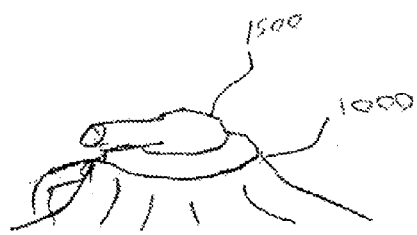
Figure 12A:
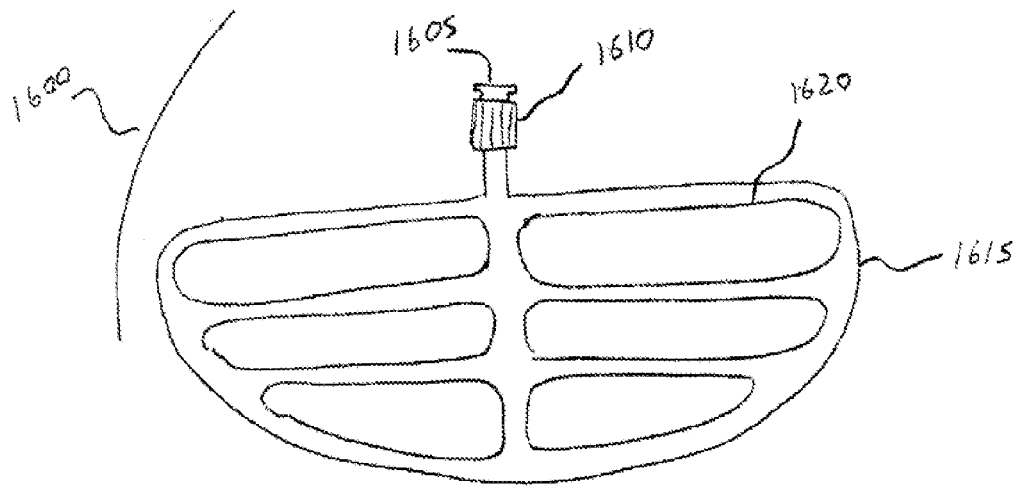
Figure 12B:
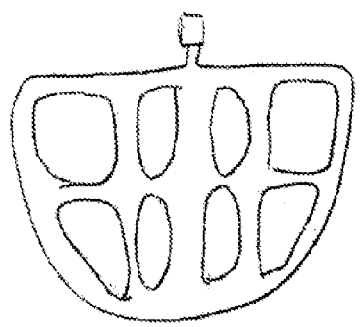
Figure 12C:
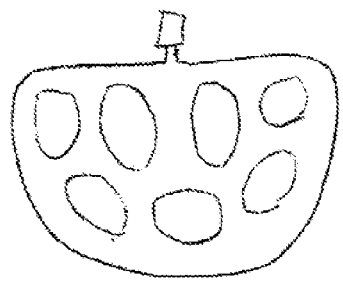
Figure 12D:
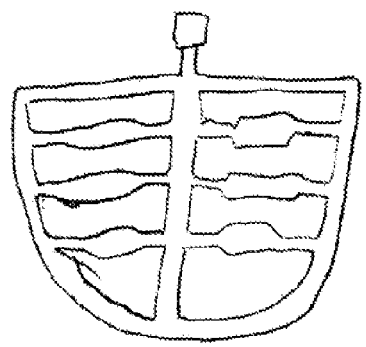

FIG. 11a is a cross-section of a lid.
FIG. 11b is a pictorial view of a lid.
FIG. 11c is a pictorial view of a lid.
FIG. 12a is a pictorial view of one embodiment of a paddle.
FIGS. 12b, 12c, and 12d are pictorial views that depict various blade configurations for stirring different kinds of food.

Figure 13A:
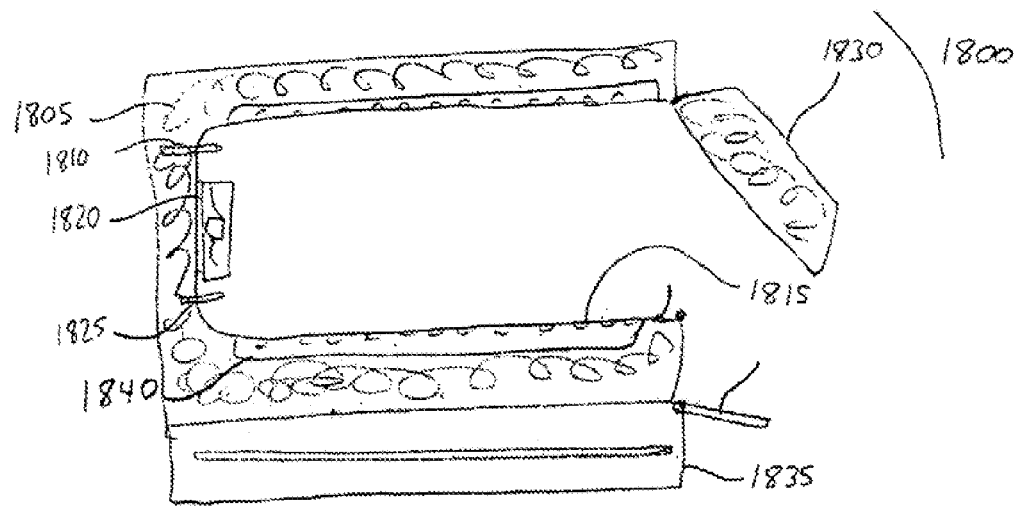

FIG. 13a is a cut-away cross section view an oven module of the present invention.

Figure 13B:
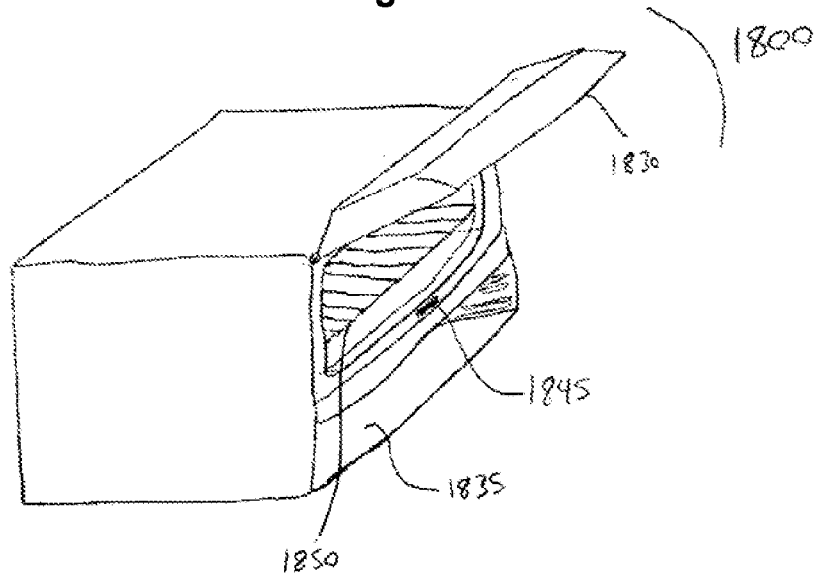
Figure 14:
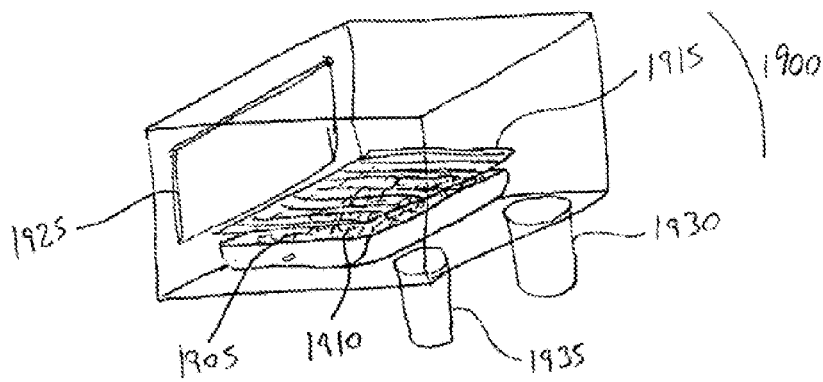
Figure 15A:
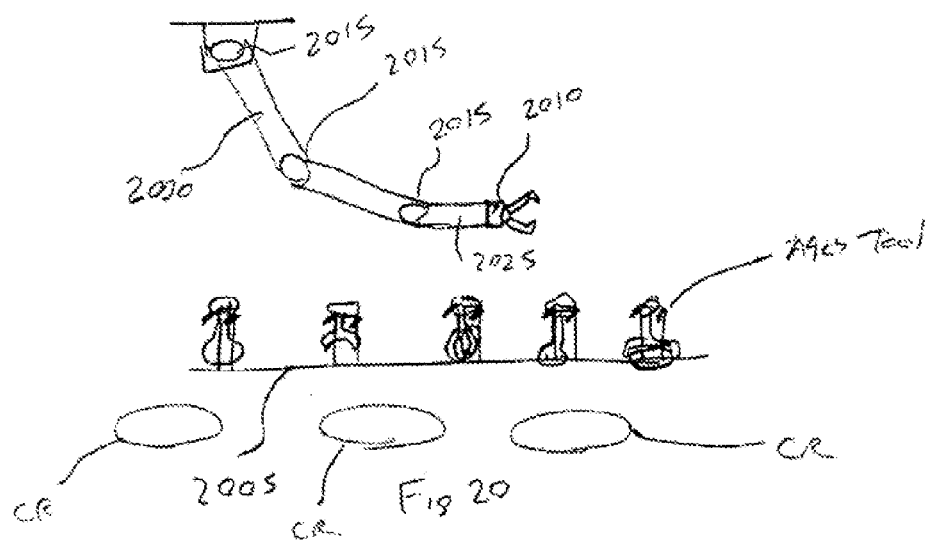
Figure 15B:
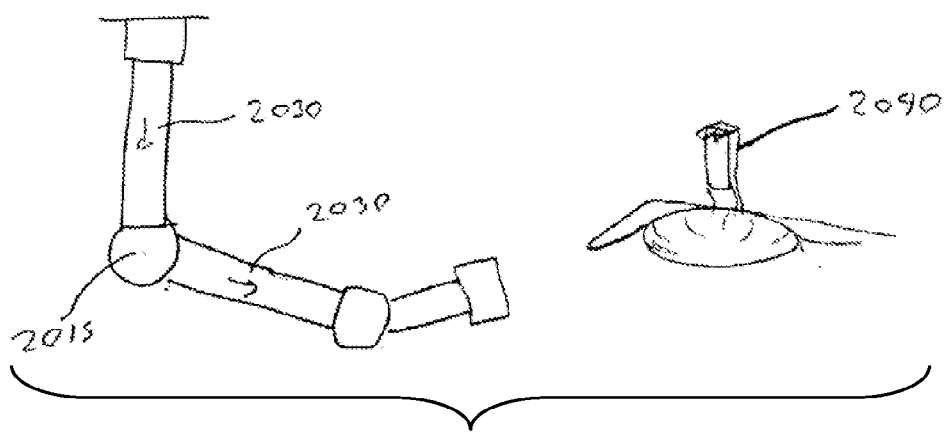
Figure 16:
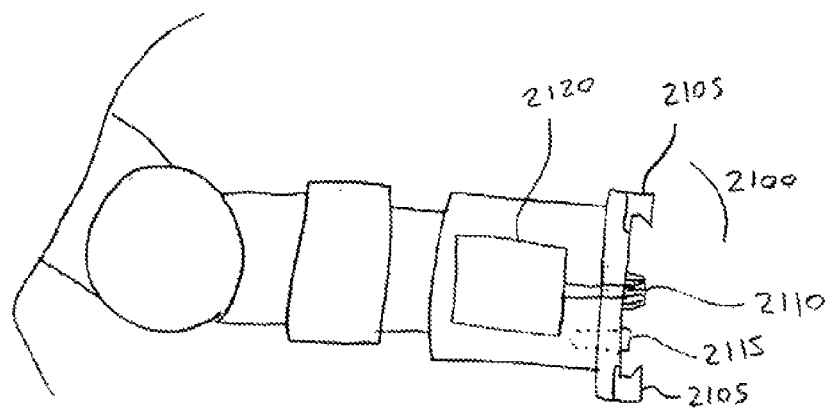

FIG. 13b is a pictorial view of the oven module.
FIG. 14 is a cut-away view of a grill module.
FIG. 15a is a pictorial view of a manipulator.
FIG. 15b is a pictorial view of the manipulator and a tool.
FIG. 16 is a close-up cut-away view of the manipulator tool attachment point.

Figure 17:
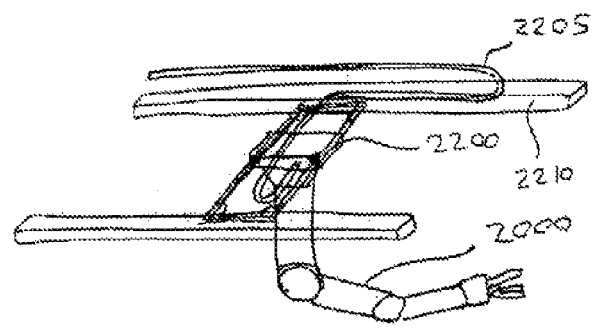

FIG. 17 is a pictorial view the manipulator mobile base that repositions the manipulator for movements to reach points beyond those which the manipulator can reach from a single stationary position.

Figure 18:
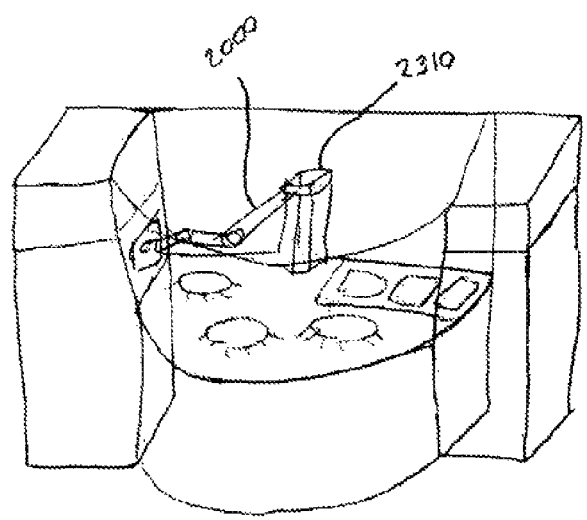

FIG. 18 is a pictorial view another embodiment in which the manipulator (2000) has a fixed attachment base (2310) and the cooking surface is configured around it in circular pattern.

Figure 19:
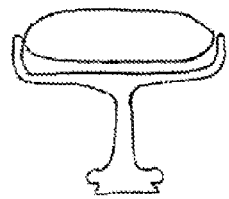

FIG. 19 shows a roller tool for rolling out cookie dough, pasta dough, and other ingredients into noodles, cookies, pie crust and various other kinds of flattened pastry items.

Figure 20:
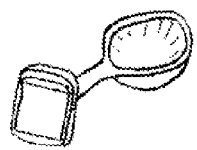
Figure 21:
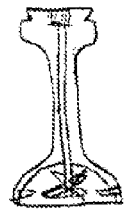

FIG. 20 shows a scoop for lifting and moving ingredients.
FIG. 21 shows a blender for blending ingredients in a cooking receptacle or other container.

Figure 22:
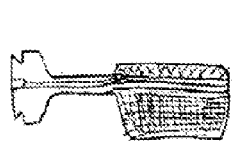

FIG. 22 shows a spice cage for flavoring dishes in which the spice such as bay leaves, cinnamon, cloves, etc. and are not intended to be left in the finished dish.

Figure 23:

FIG. 23 shows a multi-articulated grasping tool. It has no electrical connection to the main manipulator but instead is battery-powered.

Figure 24:
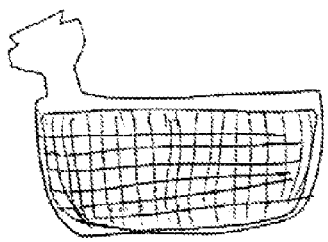

FIG. 24 shows a pasta basket for cooking and draining pasta and other items that are to be boiled and drained after cooking.

Figure 25:
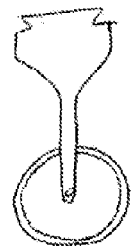
Figure 26:
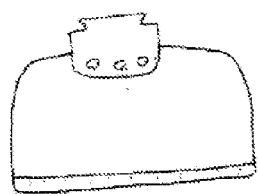
Figure 27:
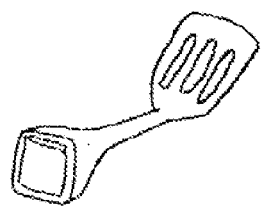
Figure 28:
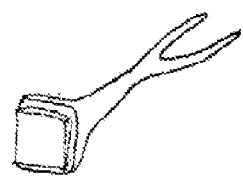
Figure 29:
Figure 30:

FIG. 25 shows a cutter tool similar to a pizza cutter.
FIG. 26 shows a chopper blade.
FIG. 27 shows a spatula used for lifting and turning items.
FIG. 28 shows an attachable fork tool.
FIG. 29 shows a simple grasping tool.
FIG. 30 shows a spark generator for igniting flames for "flambé" dishes.

Figure 31:
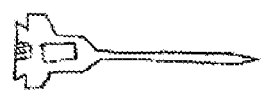
Figure 32:
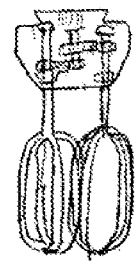
Figure 33:
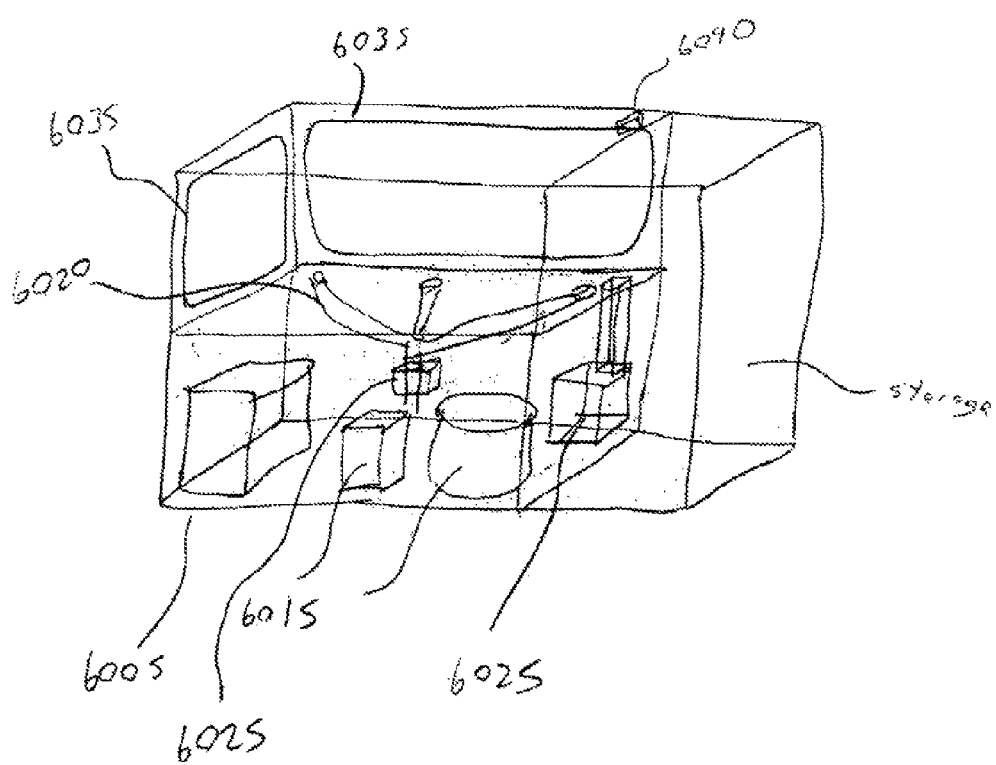

FIG. 31 shows a temperature probe.
FIG. 32 shows a mixer attachment.
FIG. 33 is a cut-away schematic view of the ancillary systems.

Figure 34:
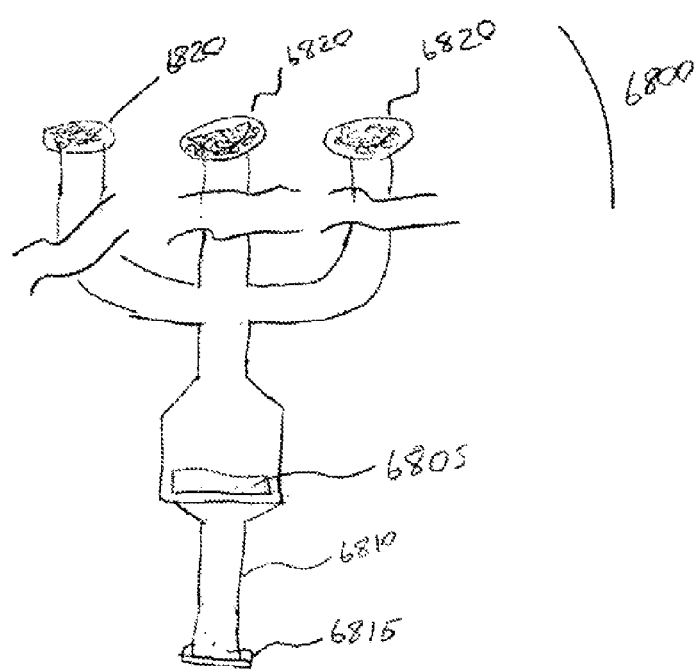

FIG. 34 is a schematic cut-away view of the waste water system.

Figure 35:
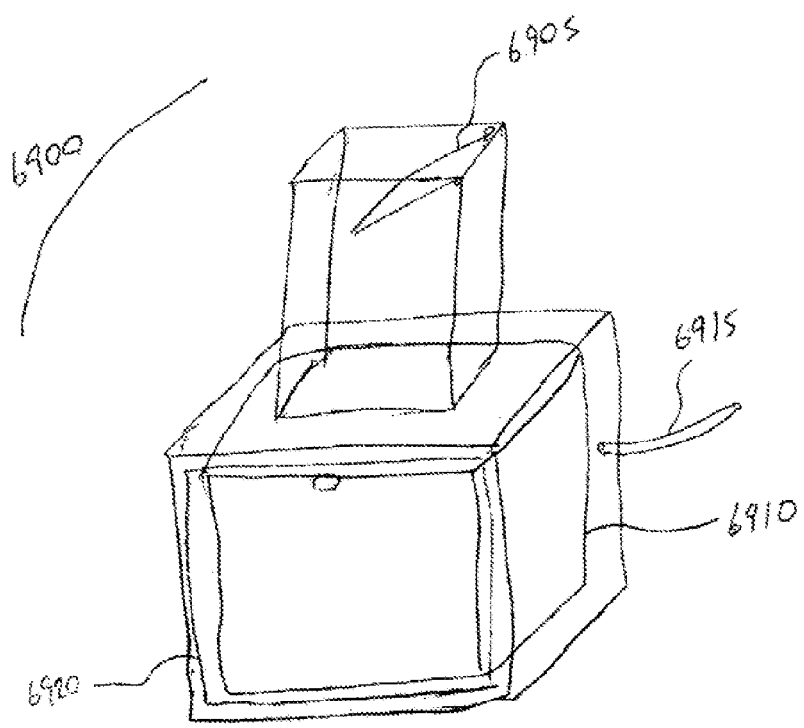
Figure 36:
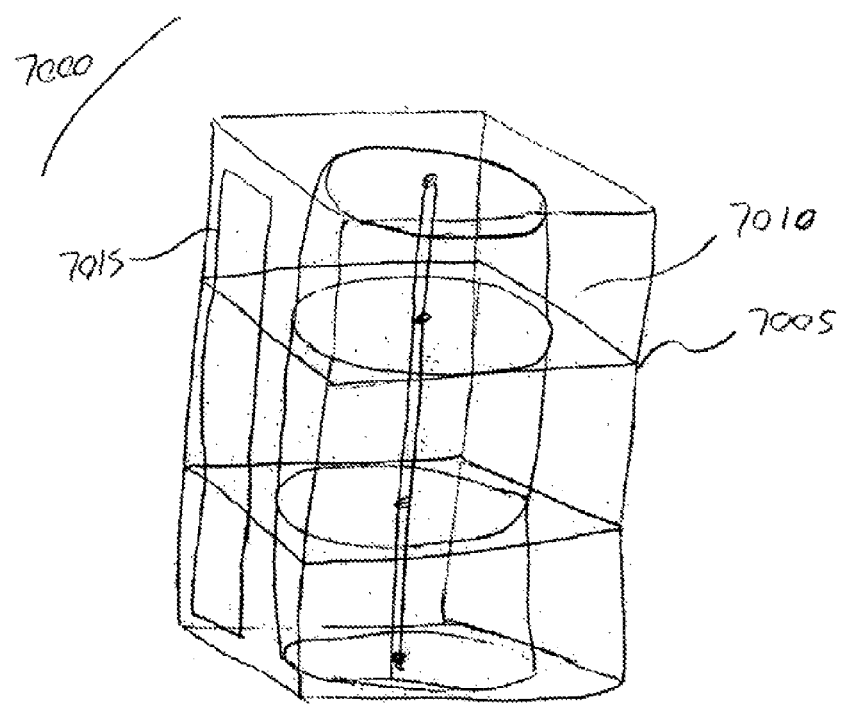
Figure 37:
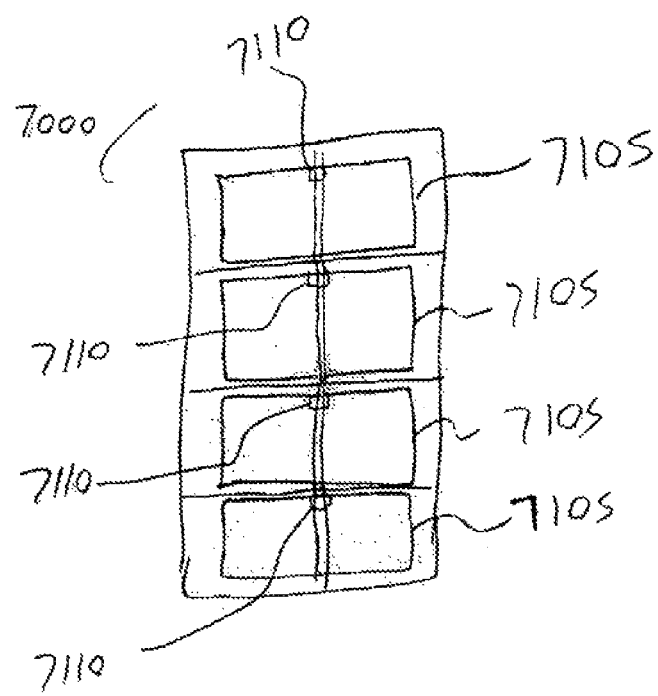

FIG. 35 is a pictorial schematic of the solid waste handling.
FIG. 36 is a cut-away view of a storage module.
FIG. 37 is a side view cutaway of one embodiment of a storage module.

Figure 38A:
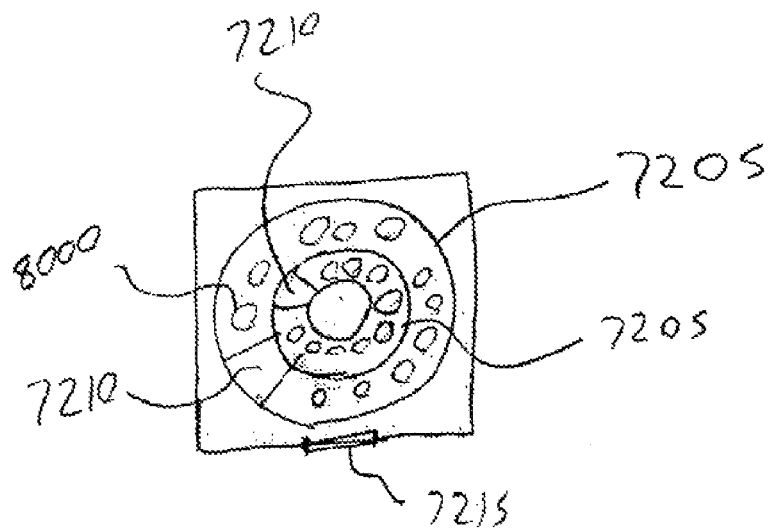
Figure 38B:
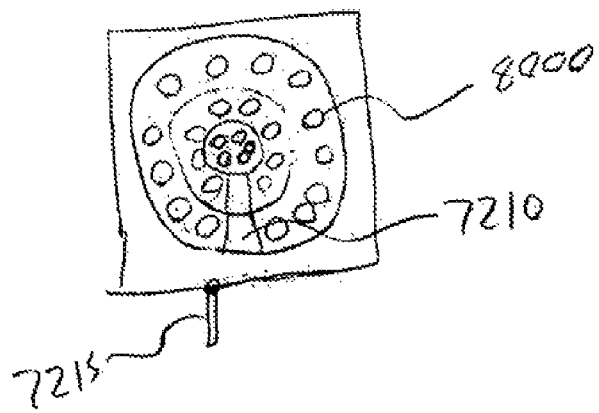

FIG. 38a is a top view of a storage module.
FIG. 38b is a top view of a storage module rotating shelf. It illustrates how the shelves are aligned to allow access through the gap.

Figure 39:
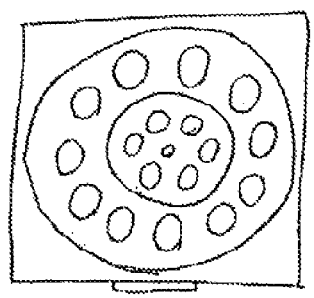

FIG. 39 is a top view of a storage module rotating shelf with two concentric independently rotating shelves.

Figure 40:
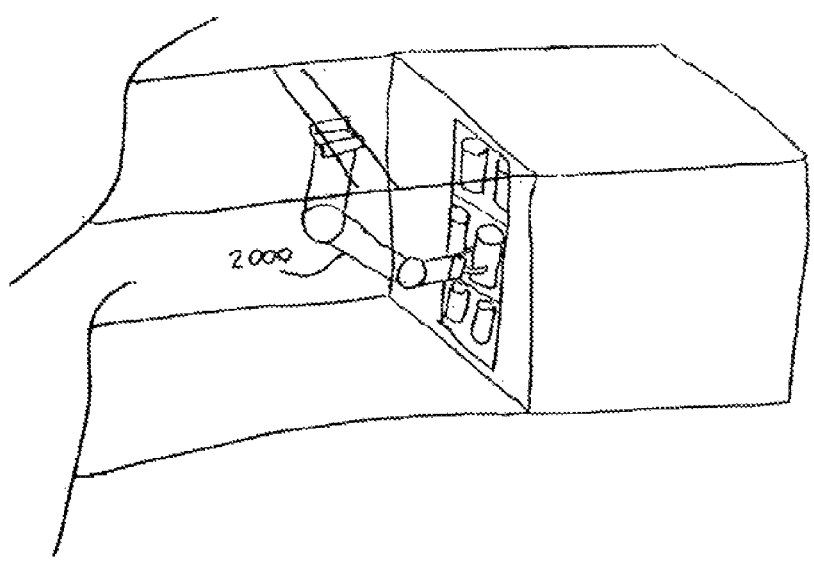

FIG. 40 is a pictorial view of the manipulator accessing a storage module.

Figure 41A:
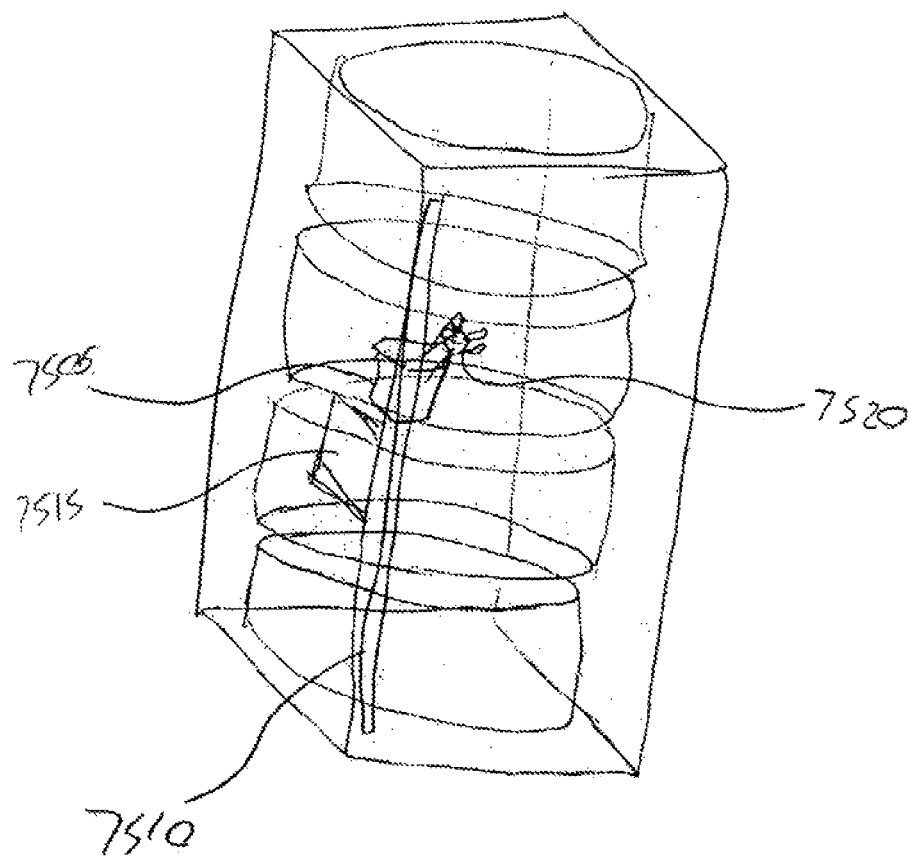

FIG. 41a is a pictorial cut-away view of a storage module with an internal retrieval system.

Figure 41B:
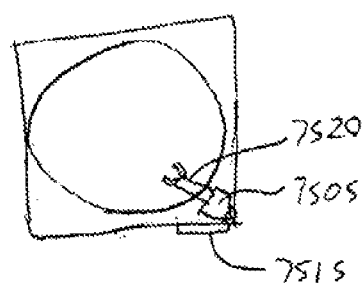

FIG. 41b is a top view of a storage module with a internal retrieval system.

Figure 42:
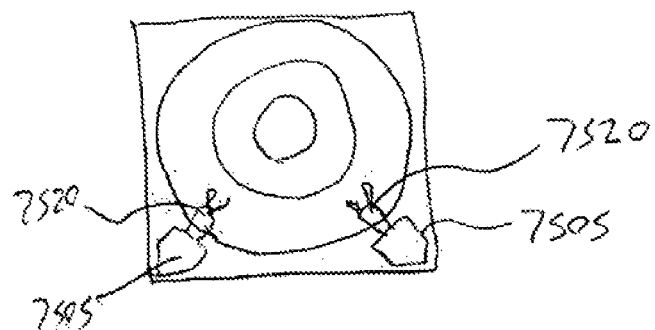

FIG. 42 is a top view of a storage module equipped with two shuttle system which doubles features depicted in FIG. 41.

Figure 43:
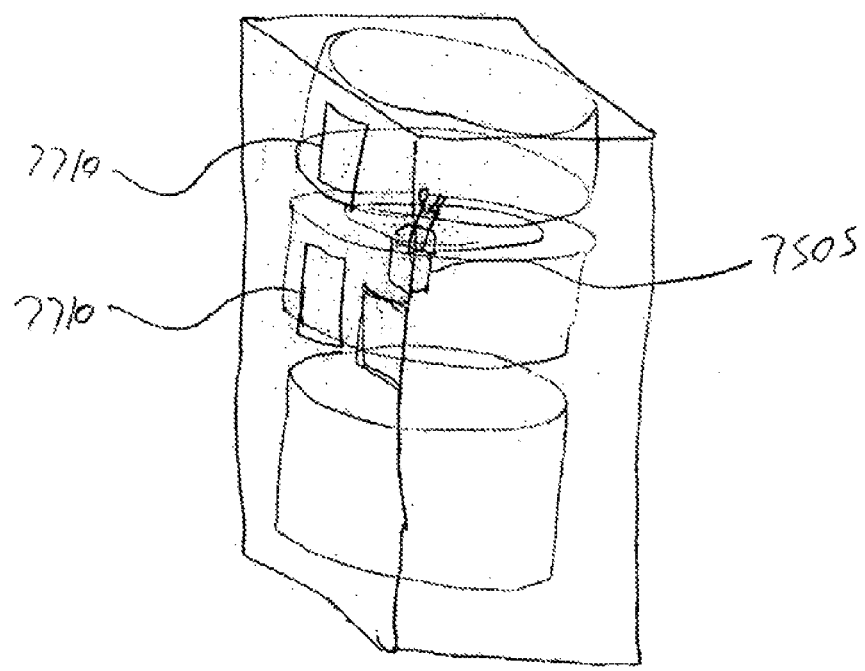

FIG. 43 is a pictorial cut-away view of a storage module equipped with a transfer shelf.

Figure 44:
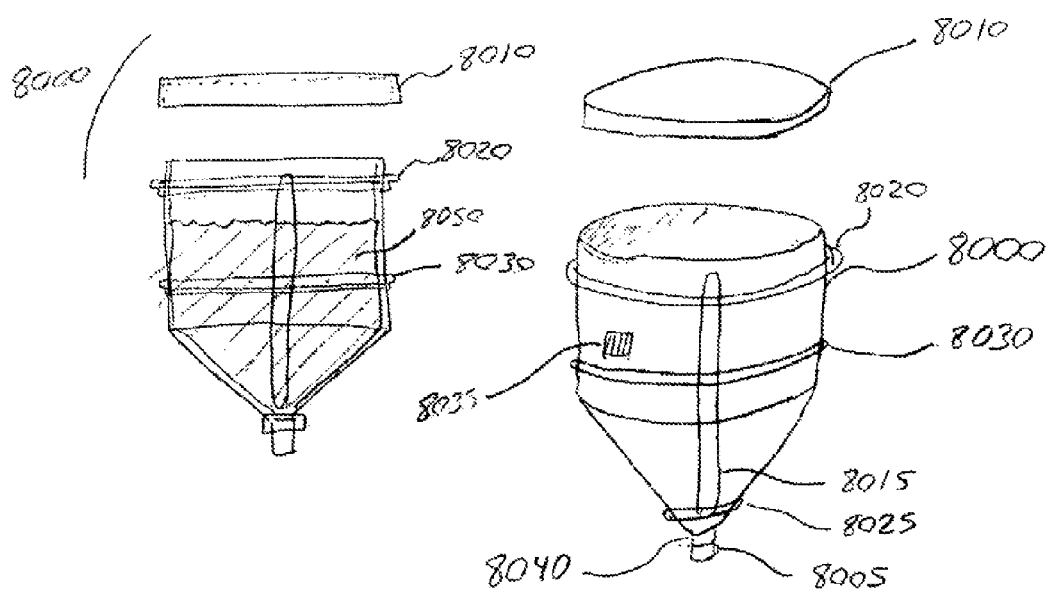

FIG. 44 is a cut-away side view (left) and pictorial view (right) of a liquid storage container.

Figure 45:
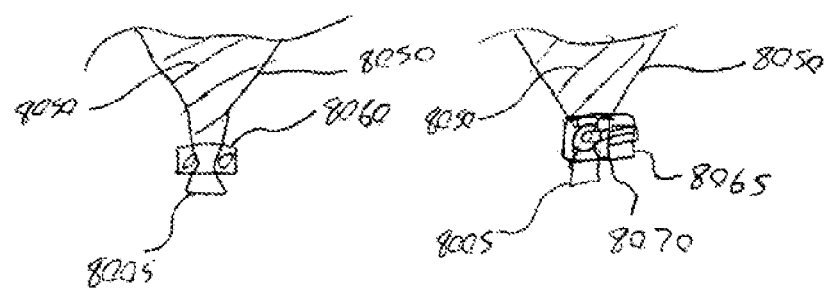

FIG. 45 is a side view cut away of a detail of the outlet spout.

Figure 46:
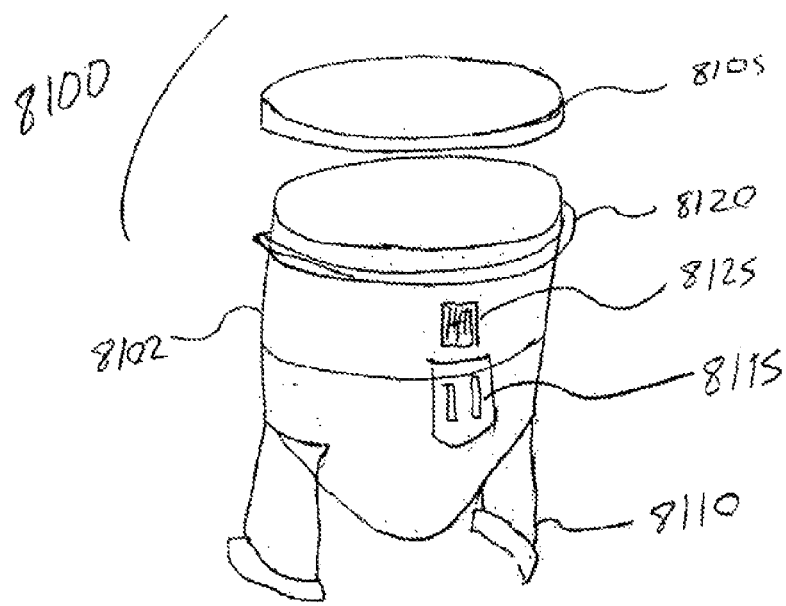
Figure 47:
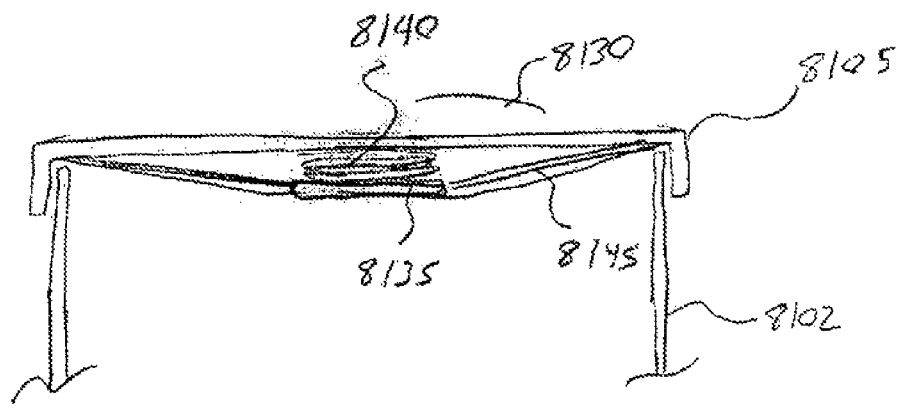

FIG. 46 is a pictorial view of a storage container (8100).
FIG. 47 is a cross-section side view of one embodiment of the lid (8105).

Figure 48:
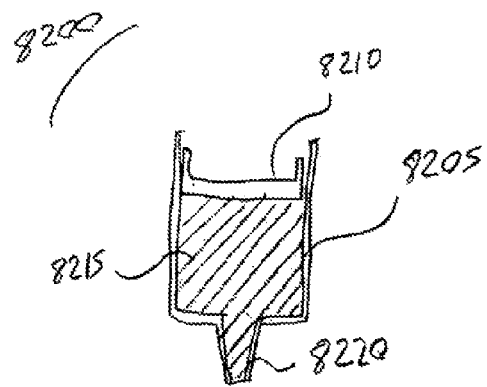

FIG. 48 is a cross sectional view of a viscous ingredient container.

Figure 49:
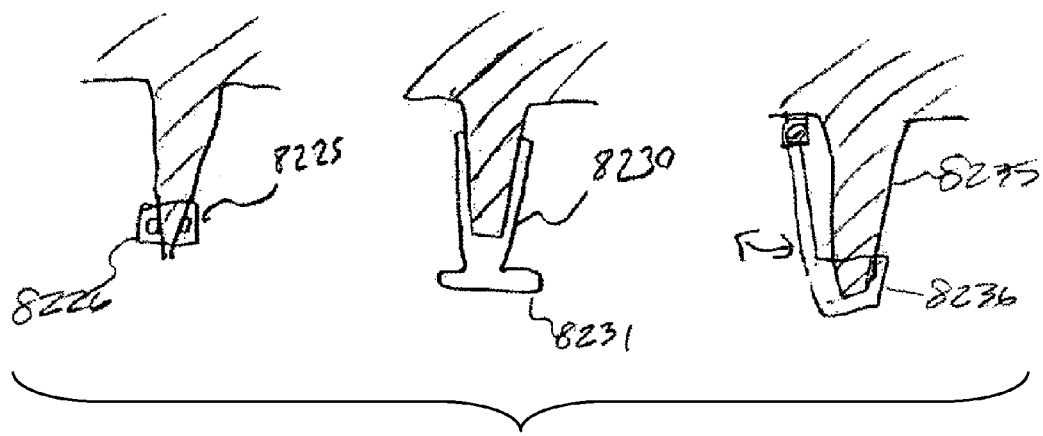

FIG. 49 is a cross sectional view of three embodiments of nozzles.

Figure 50:
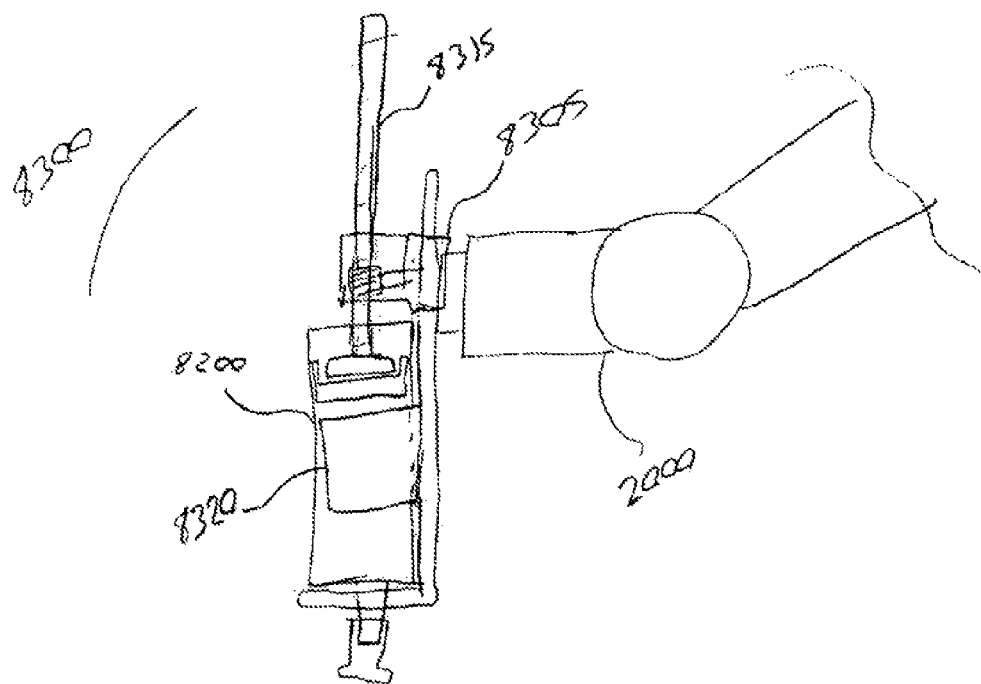
Figure 51:
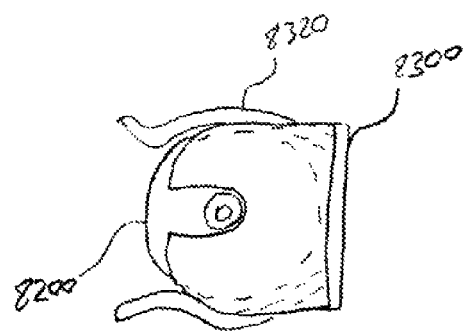

FIG. 50 is a cut-away view of the dispensing tool.
FIG. 51 is a bottom view of the dispensing tool with a viscous ingredient container.

Figure 52:
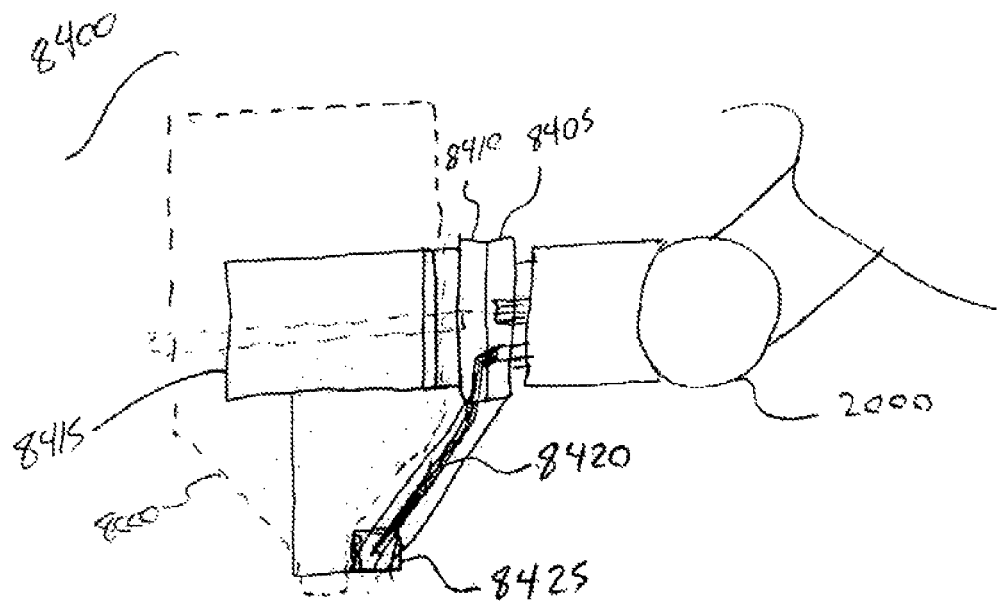

FIG. 52 is a side view cut away view of a liquid ingredient dispensing tool.

Figure 53:
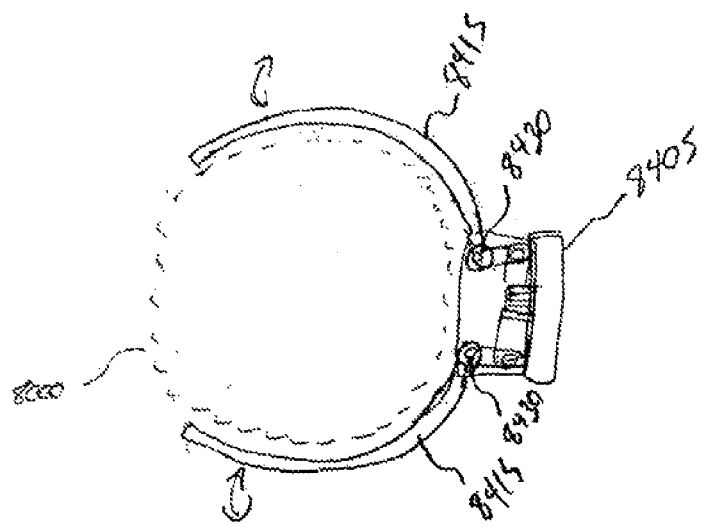

FIG. 53 is a top-view cut-away of the connection interface of the liquid ingredient dispensing tool.

Figure 54:
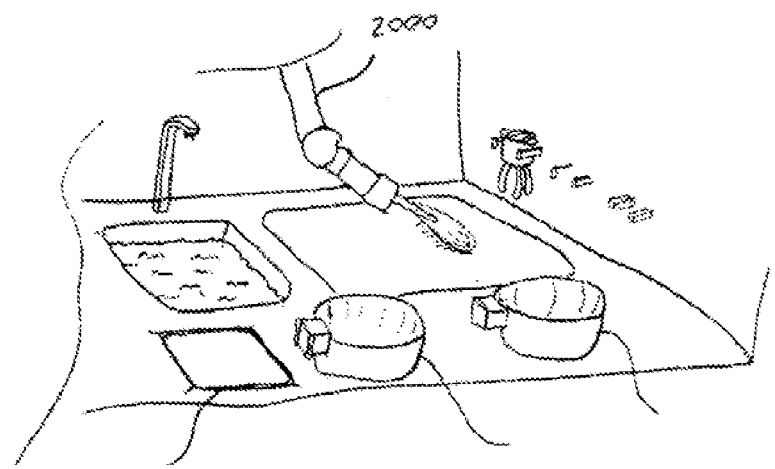

FIG. 54 is a pictorial view of several the food preparation area and several tools.

Figure 55:
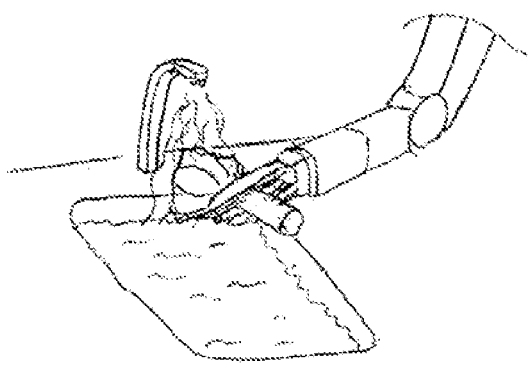

FIG. 55 is a pictorial view of the food rinse basin.

Figure 56:
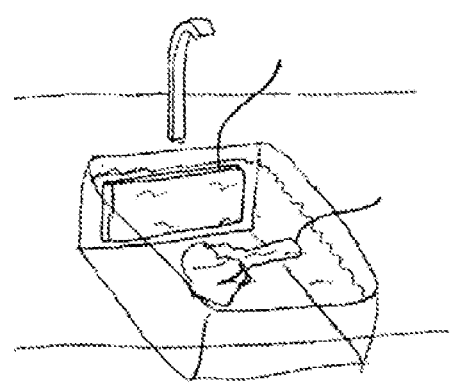

FIG. 56 is a pictorial view of a vegetable being washed in an ultrasonic wash bath.

Figure 57:
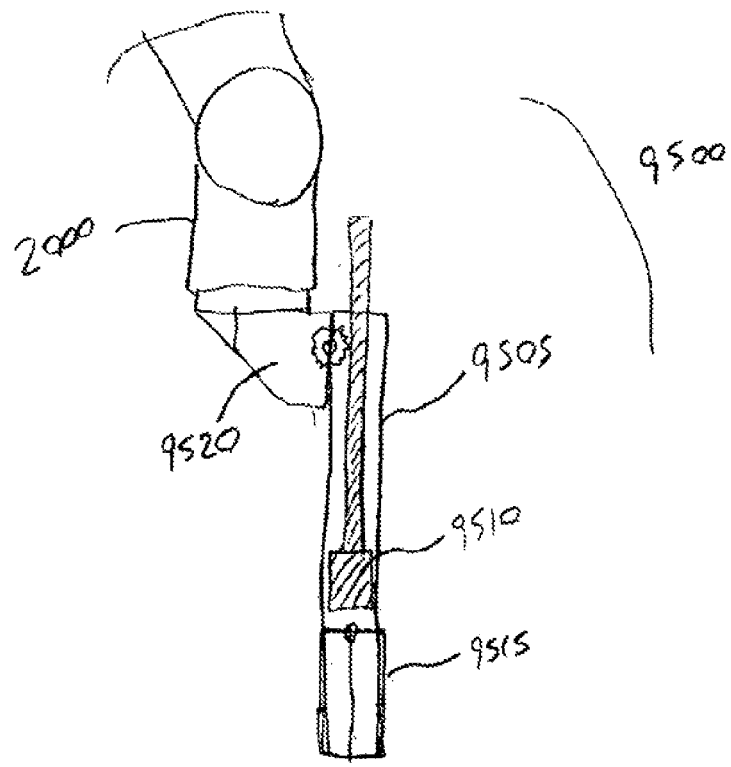

FIG. 57 is a partial cut-away side view of a dry ingredient measurement and transport tool.

Figure 58:
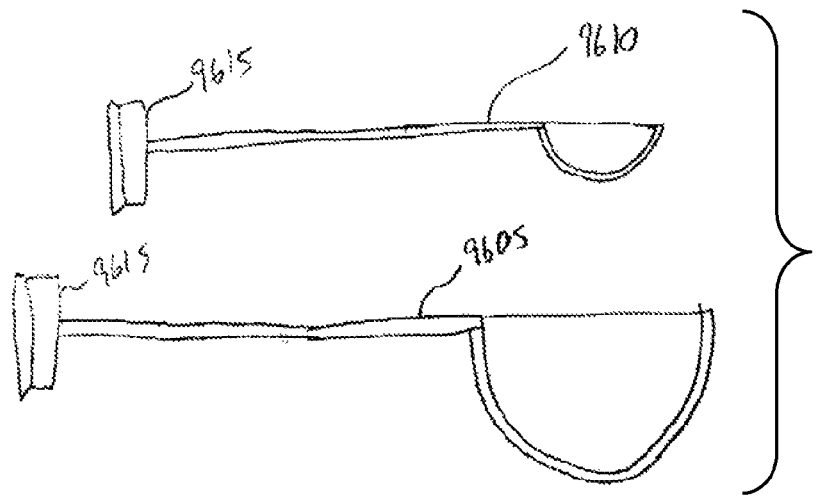

FIG. 58 is a side view cut away view of two dry scooping tools.

Figure 59:
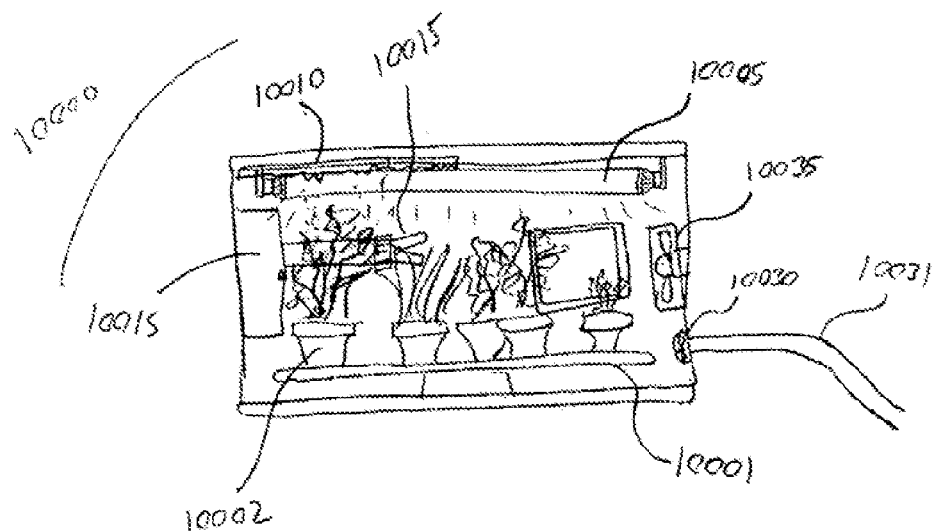

FIG. 59 is a side pictorial view of a greenhouse module.

Figure 60:
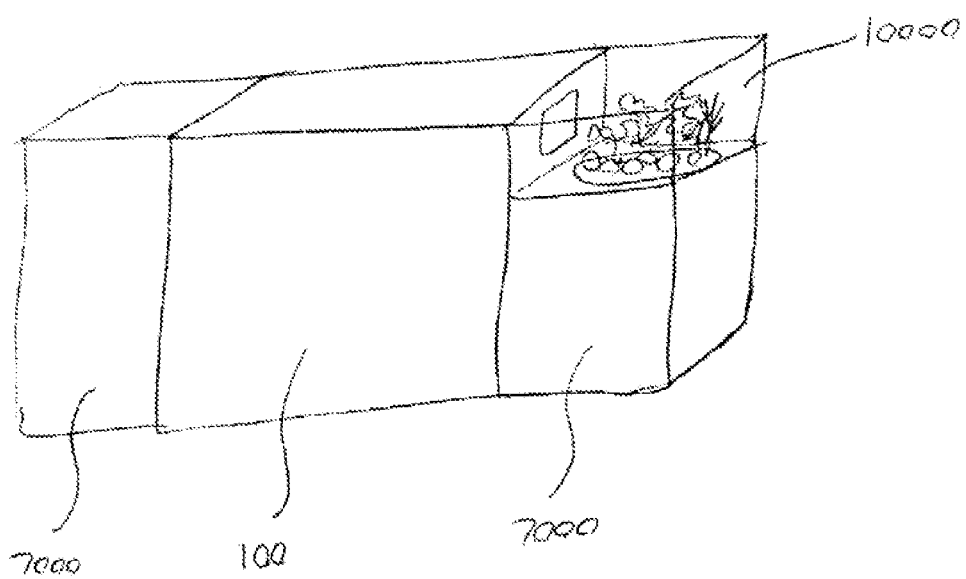

FIG. 60 is an open pictorial view of a greenhouse module.

Figure 61:
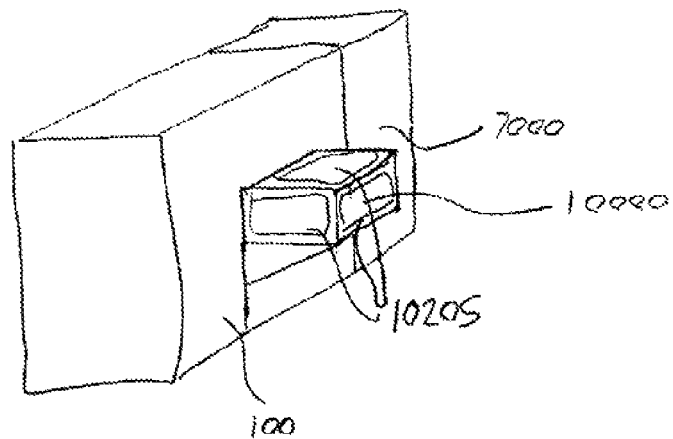

FIG. 61 is a pictorial view of a possible alternate position for a greenhouse module.

Figure 62:
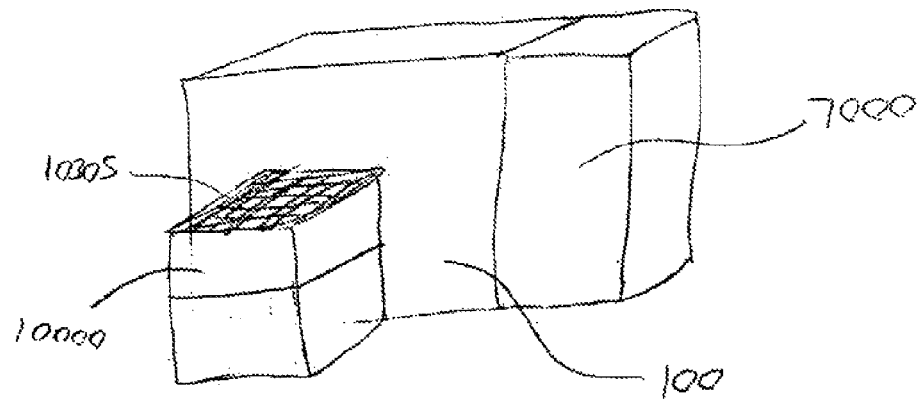

FIG. 62 is a pictorial view of another option for inside mounting.

Figure 63:
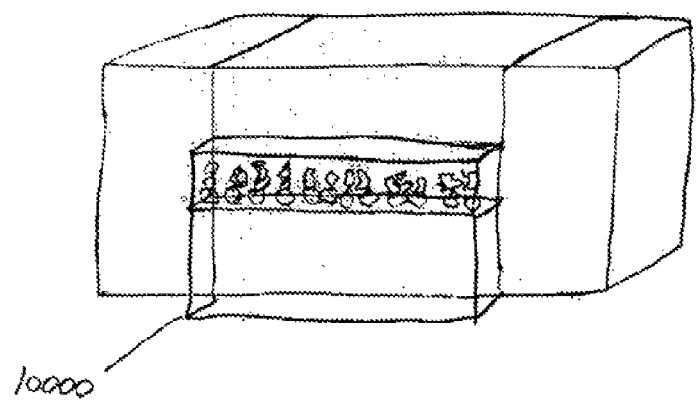

FIG. 63 is a pictorial view of another embodiment for mounting.

Figure 64:
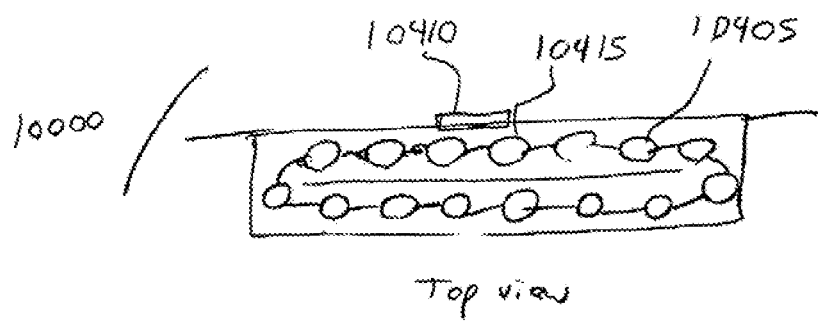

FIG. 64 is a top view of a greenhouse module track system.

Figure 65:
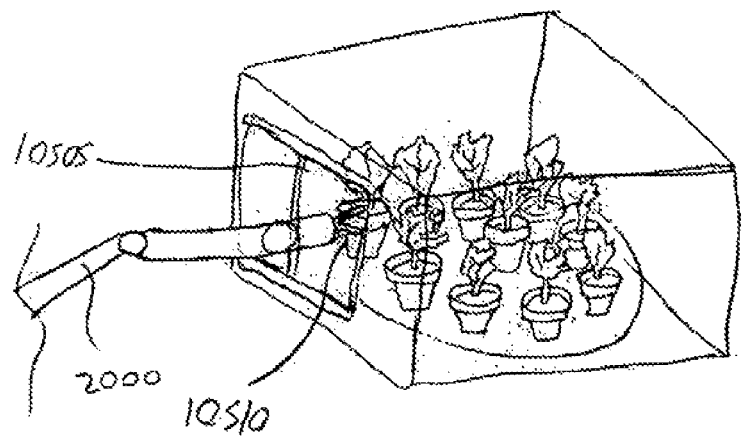

FIG. 65 is a pictorial cut-away view of a harvesting system.

Figure 66:
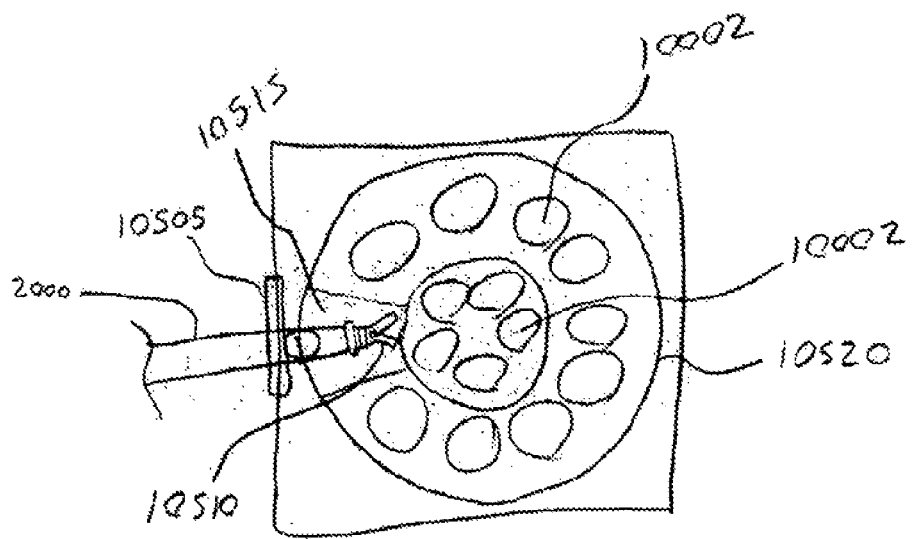

FIG. 66 is a top view of the rotating carousel platform.

Figure 67:
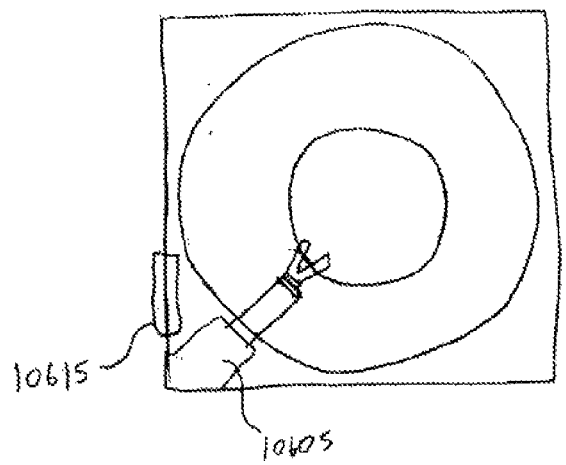

FIG. 67 is a top view of another embodiment of a small harvesting mechanism.

Figure 68:
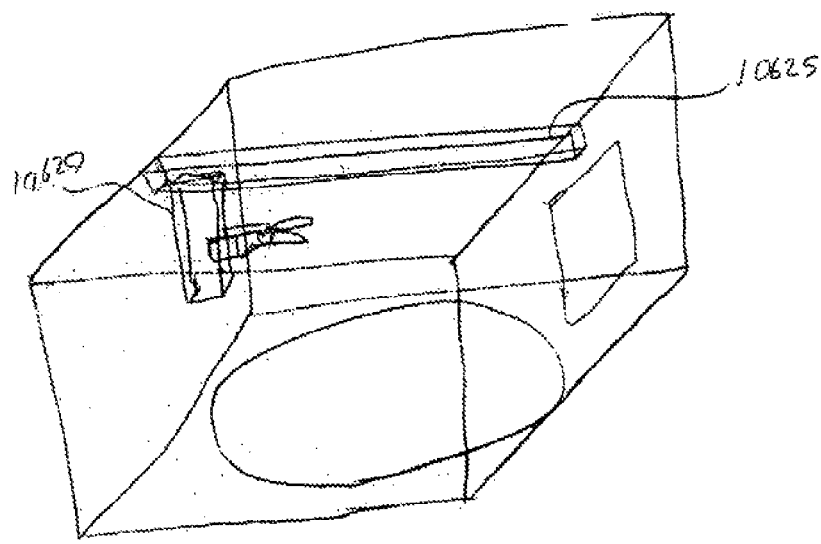

FIG. 68 is a pictorial exposed view of another embodiment of a harvesting system.

Figure 69:
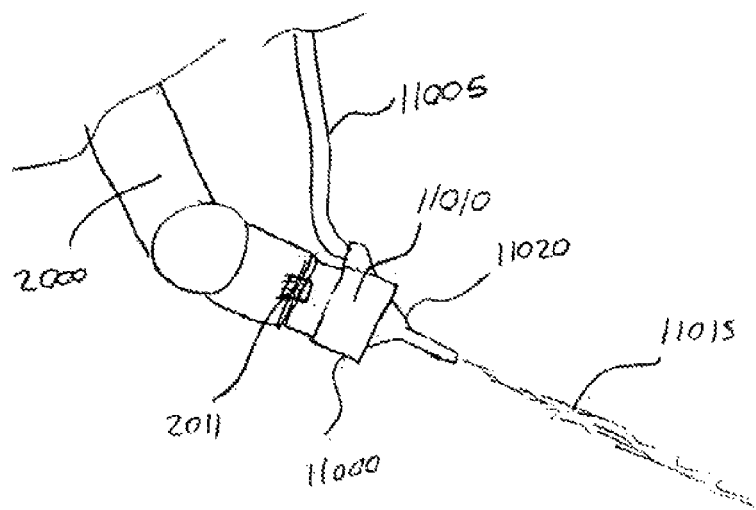

FIG. 69 is a pictorial view of a high-pressure spray tool.

Figure 70:
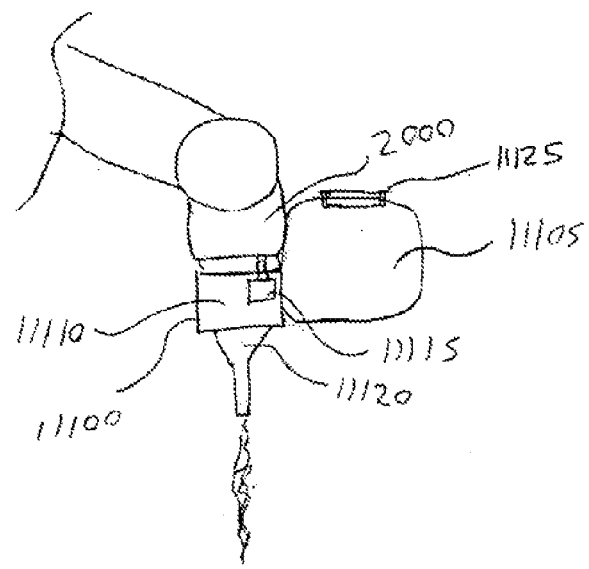

FIG. 70 is a pictorial view of a spray brush tool with a reservoir.

Figure 71:
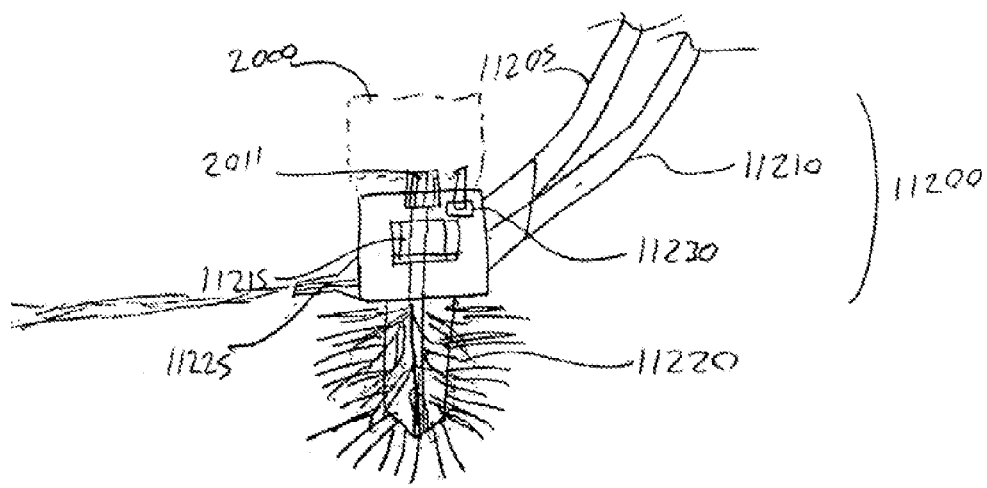

FIG. 71 is a pictorial view of the spray brush tool.

Figure 72:
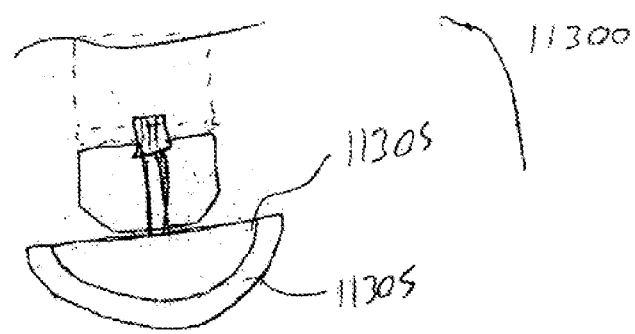

FIG. 72 is a side cut-away view of a attachable polishing tool.

Figure 73:
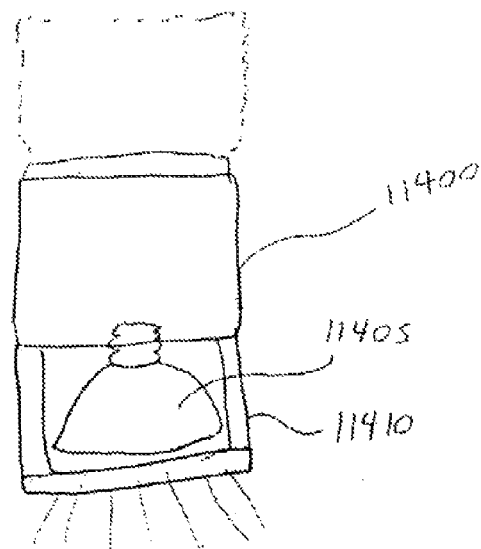

FIG. 73 is a side view cut-away of a transportable UV sanitizing light.

Figure 74:
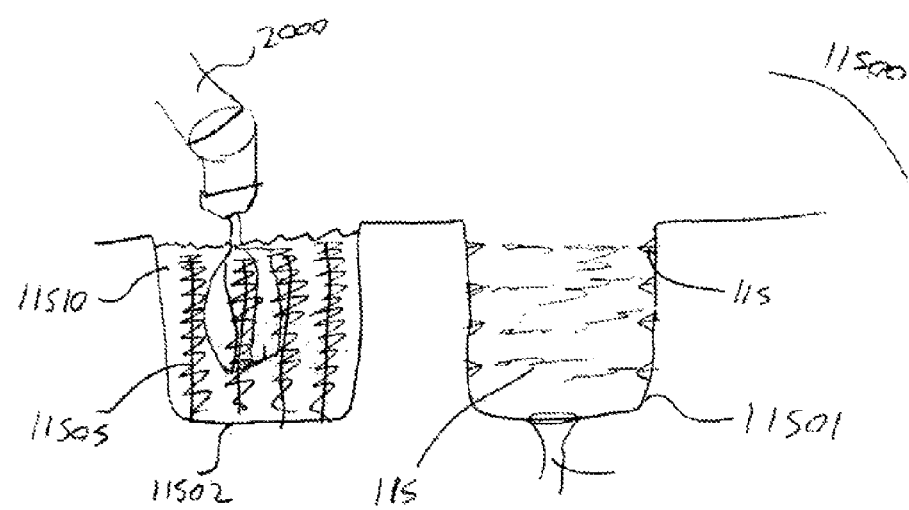

FIG. 74 is a side cut-away view of the tool and dish cleaning area.

Figure 75:
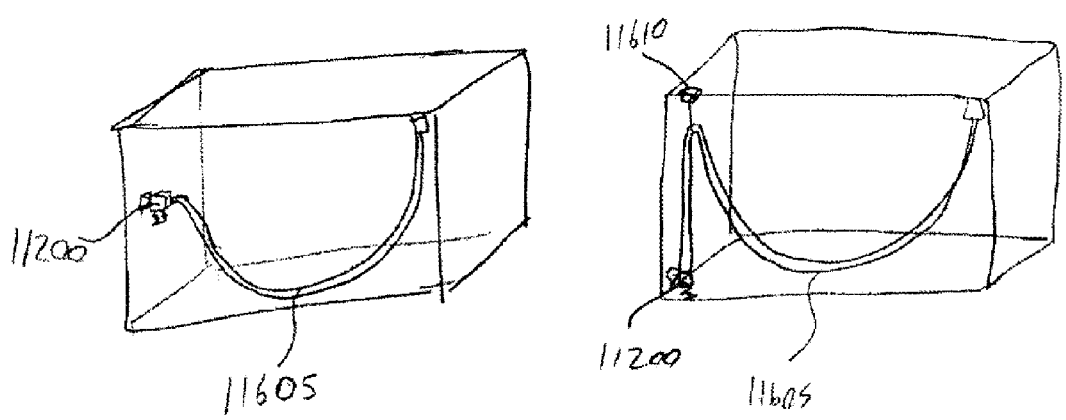

FIG. 75 is a pictorial cut-away view of how the cleaning system that utilizes hoses.

Figure 76:
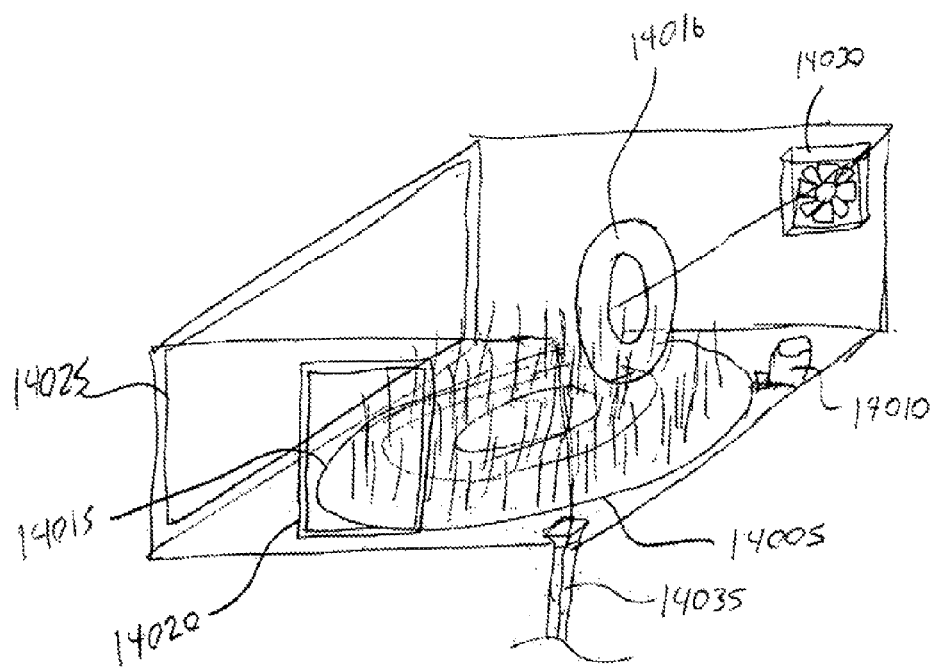

FIG. 76 is an cut-away pictorial view of the dishware storage system.

Figure 77:
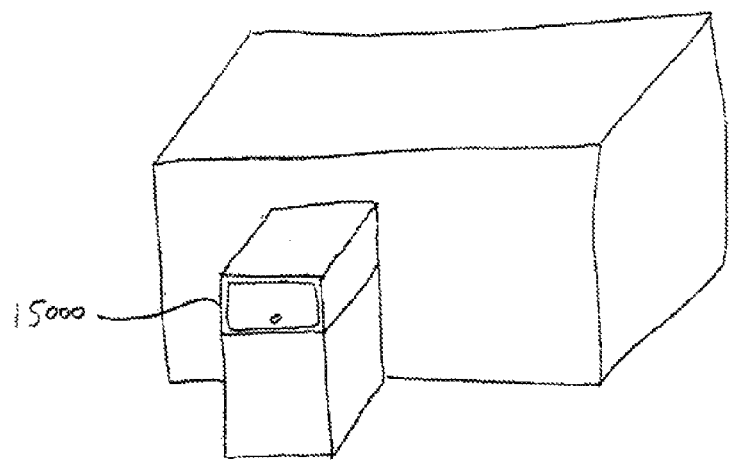

FIG. 77 is a pictorial view of the dish and food transfer area.

Figure 78:
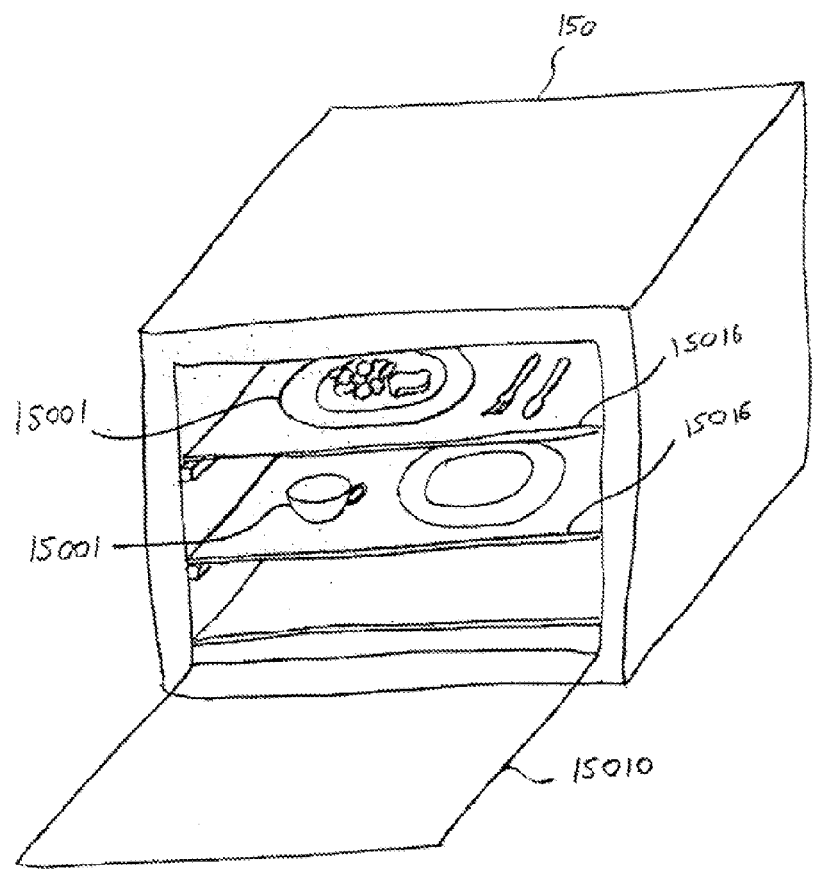

FIG. 78 is a pictorial view of the dish and food transfer area with an open door.

Figure 79:
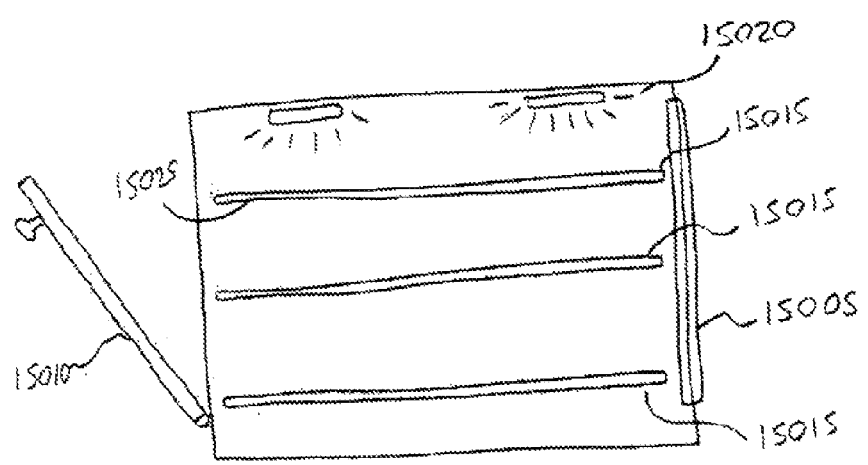

FIG. 79 is a side cut-away view of the dish and food transfer area.

DETAILED DESCRIPTION OF INVENTION

Cooking and Processing Area

The FPS is contains a central cooking/processing area. The cooking area is where the cooking receptacles are located, and in the preferred embodiment, the primary manipulator has access to most other areas of the device from this area.

Figure 1:
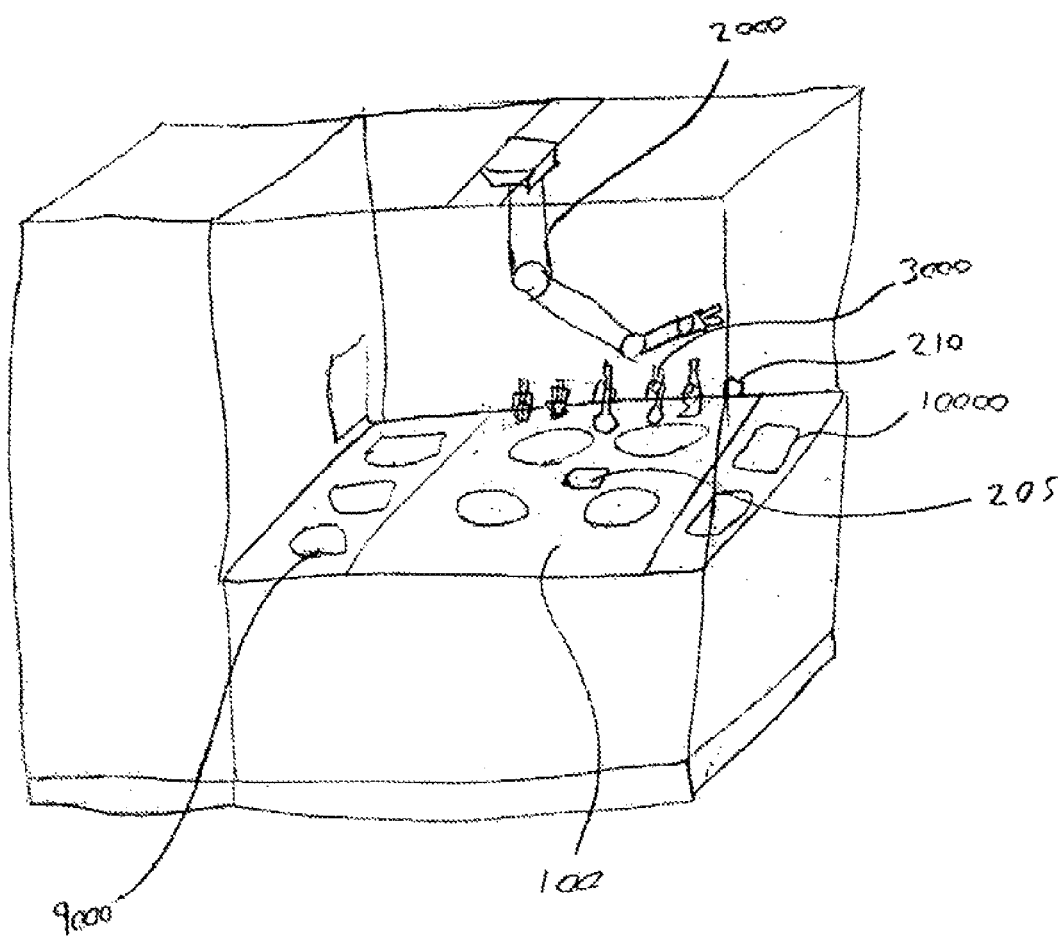
FIG. 1 is a cutaway pictorial view of the central cooking/processing area space.

FIG. 1 is a cutaway pictorial view of the central cooking/processing area space which includes cooking receptacles and a manipulator mounted from above, with access to other modules/areas used in cooking, such as an oven, a grill, the cleaning area, and the storage modules. As depicted, the cooking/processing area includes the primary manipulator (2000), several cooking receptacles (1000) in the cooking area (100), some attachable tools (3000), several attachable tool holding racks (210), a water drain (205), and a preparation area (9000) and a cleaning area (10000).

Figure 2:
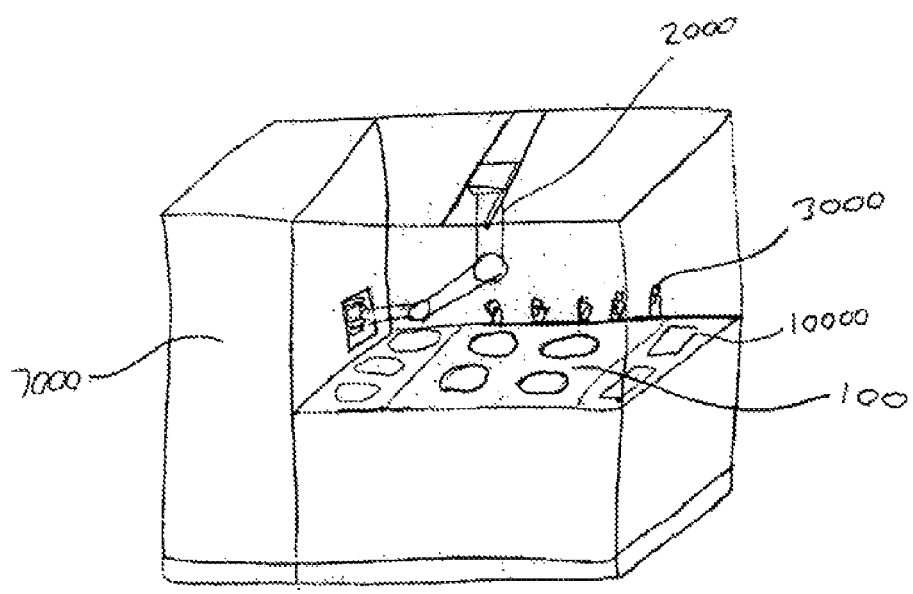
FIG. 2 is a cutaway pictorial view of the primary manipulator.

FIG. 2 is a cutaway pictorial view of the primary manipulator. As depicted the primary manipulator (2000) is shown accessing ingredients in a storage area (7000). The cooking receptacles (1000) are accessible by the primary manipulator (2000). The primary manipulator (2000) processes the ingredients and uses the cooking receptacles (1000) to cook them.

The cooking area is equipped with a drain system ( ), so waste water and scraps may be washed down by the cleaning system without leaving puddles of standing water. The drain (105) is be located in the center of the enclosure in one configuration or along the edges in another.

The cleaning system has the capability to clean up spills and splashes with brushes, water jets, etc.

In one embodiment, the cleaning system comprises ultraviolet lights. In this embodiment, the interior of the area is coated with TiO2, which photocatalyzes organic materials that buildup on the surface and allow them to be rinsed away thus minimizing the cleaning effort required. In one embodiment, the interior of the cooking/processing area is white enamel with TiO2 pigment to keep the whole interior well lit and the light well distributed.

FIG. 3 is a pictorial view of a stereo video camera system. As depicted the stereo video camera system (305) is built into the primary manipulator and is inspecting some cooking food.

The primary manipulator performs most of the tasks in the cooking/processing area utilizing "Attachable Tools".

FIG. 4a is a pictorial view of the primary manipulator. As depicted, the primary manipulator (2000) is picking up an attachable tool. During the food preparation process, the primary manipulator switches from one tool to another as needed. The tools consist of things like mixing tools, beating tools, spatulas, scooping tools, and other more specialized tools. These tools are discussed in more detail in the "Attachable Tools" section and in the "Ingredient Preparation" sections.

FIG. 4b is a pictorial view of the primary manipulator. As depicted, the primary manipulator (2000) is shown using a cleaning tool ( ) to clean out a cooking receptacle. In one embodiment, the cleaning tool has clean water and soapy water lines as well as a dirty water return line with a pump drive. The cleaning tools are discussed in more detail in the "Cleaning System" section.

FIG. 4c is a pictorial view of the primary manipulator. As depicted, the primary manipulator (2000) is shown emptying the contents of a temporary storage container (415) into a cooking receptacle (1000).

FIG. 4d is a pictorial view of the primary manipulator. As depicted the primary manipulator is transferring a cooked steak (420) onto a serving plate (430).

FIG. 4e is a pictorial view of the primary manipulator. As depicted, the primary manipulator (2000) is scooping cooked vegetables (440) from a cooking receptacle (1000) using a scooping tool (450).

FIG. 4f is a pictorial view of the primary manipulator. As depicted, the primary manipulator (2000) is switching to a new tool (405). The primary manipulator (2000) uses a set of attachable tools to process the ingredients. The attachable tools is shown on a tool rack (410). The storage system may be located inside the cooking area, or in another configuration, loaded on a rotating tray in one of the storage systems.

FIG. 5 is a pictorial view of the primary manipulator cleaning the cooking area. As depicted, the primary manipulator (2000) is shown utilizing an attachable spray tool (500) to clean a cooking receptacle. The primary manipulator is central to the cleaning process. It picks up the cleaning tools, which some instances have a built-in water supply, and uses them to clean the cooking area.

Cooking and Processing Area Operation

During the preparation process, food is prepped, moved to cooking receptacle, cooked, in some instances held, and served. This involves tool changes, and transfer of ingredients from the preparation area to the cooking receptacles and then transfer to serving dishes. After the preparation tasks are complete, as well as during the preparation process, cleaning tasks are performed. All tasks are supervised and commanded by the control system.

The primary manipulator uses a set is attachable tools to process the ingredients, the attachable tools are stored on storage system. The storage system may be located inside cooking area, or another configuration loaded on a rotating tray in one of the storage systems.

Layout Configurations

The food preparation system has several main sections. One is for ingredient storage, another is for food preparation, in another section is where the food preparation tools are cleaned, and cooking occurs in another. In most embodiments, the ingredient storage area is separated into room-temperature storage and refrigerated storage modules. FIGS. 3A through 3E several potential configurations of the food preparation system.

Figure 3A:
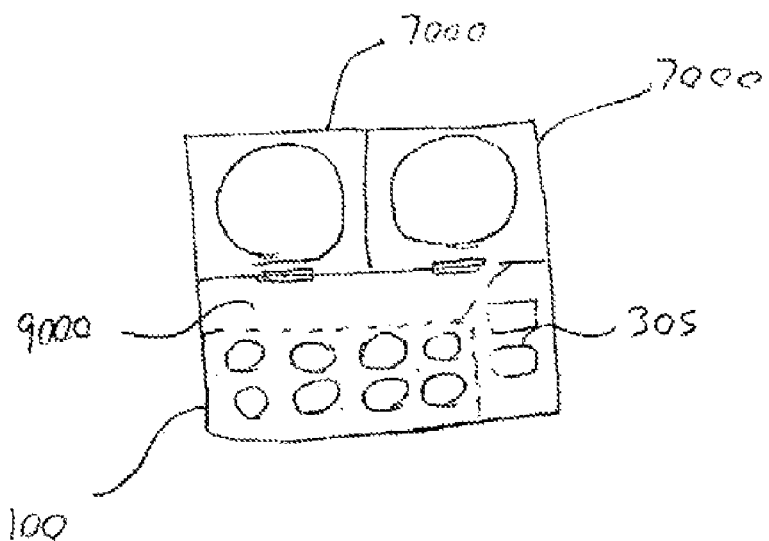
FIG. 3a is an overhead pictorial view of the food preparation system.

FIG. 3A is an overhead pictorial view of the food preparation system. As depicted, the storage modules (7000) sit side-by-side and face the food preparation area (9000) which faces the cooking module (100) and the cleaning module (11500).

Figure 3B:
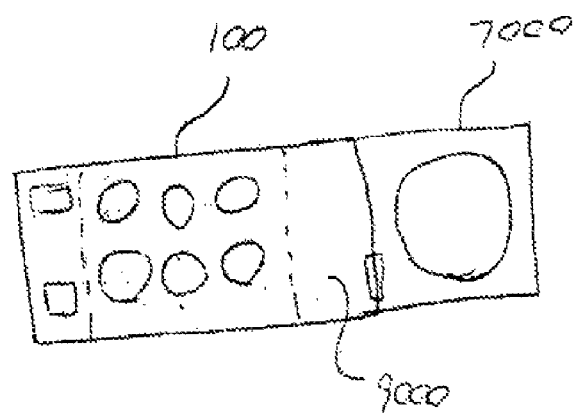
FIG. 3b is an overhead pictorial view of an alternate configuration of the food preparation system.

FIG. 3B is an overhead pictorial view of an alternate configuration of the food preparation system. As depicted, it incorporates the same components, but the refrigerated and room-temperature storage modules (7000) are stacked on top of each other and set to the end of the cooking module (100) making for a longer but narrower overall footprint. This makes for a smaller system that fits more easily into smaller spaces and one that is less expensive to manufacture.

Figure 3C:
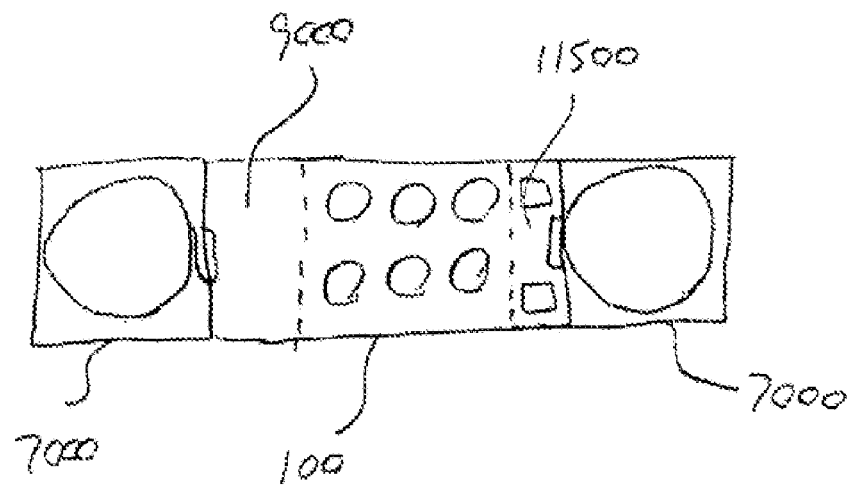
FIG. 3c is an overhead pictorial view of an alternate configuration of the food preparation system.

FIG. 3C is an overhead pictorial view of an alternate configuration of the food preparation system. As depicted this configuration locates the food preparation area (9000), the cooking module (100), and the cleaning area (11500) between a pair of storage modules (7000) in a linear row. This linear format may fit more easily into certain buildings especially homes.

Figure 3D:
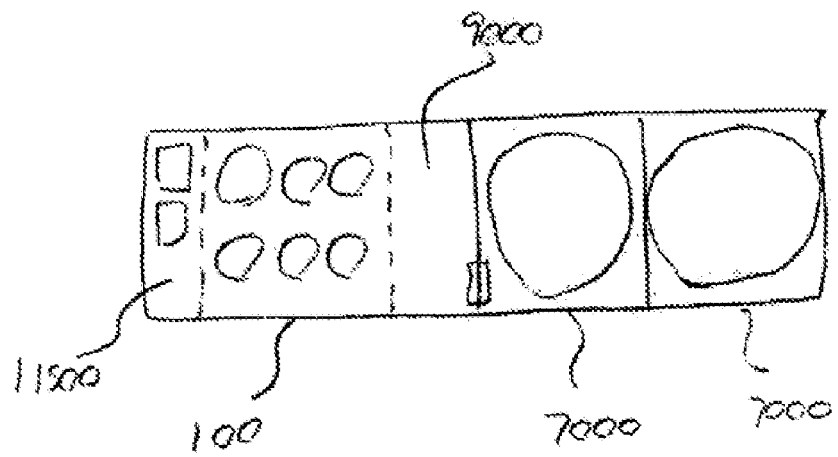
FIG. 3d is an overhead pictorial view of an alternate configuration of the food preparation system.

FIG. 3D is an overhead pictorial view of an alternate configuration of the food preparation system. As depicted, this configuration includes locates two food storage modules (7000) side by side on one side of the food preparation module (9000) and the cooking module (100).

Figure 3E:
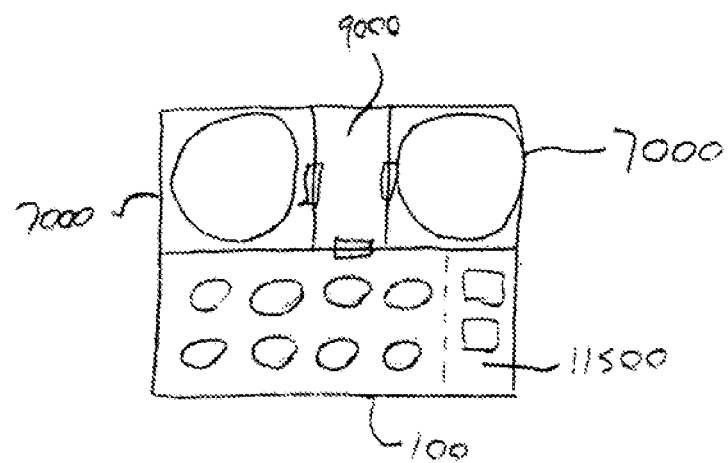
FIG. 3e is an overhead pictorial view of an alternate configuration of the food preparation system.

FIG. 3E is an overhead pictorial view of an alternate configuration of the food preparation system. As depicted, this configuration places the storage modules (7000) on either side of the food preparation area (9000) which faces the cooking module (100) and the cleaning module (11500).

Modular Components

FIG. 6 7 is pictorial view of a FPS consisting of a monolithic module. In one embodiment, the monolithic module (700) has various systems, including but not limited to the ingredient storage system (7000), ingredient preparation area (9000), cooking area (100), cleaning and washing area (11000).

In the one embodiment, the FPS is a single monolithic element that contains the cooking area, the storage systems, primary manipulator, and cleaning system.

In another embodiment, the FPS is implemented as a central cooking/processing module with other modules that attach to the central module. This makes the system easier to transport and install. It also allows users to obtain the functionality they desire without purchasing functionality if they don't need, for example, a greenhouse or a grill.

In one embodiment, the central module has removable panels to allow attachment of various optional modules or to be left on if the module is not purchased. This allows for in-the-field upgrades. It also allows a single core module to be manufactured that can easily be customized for different buyers by selling it with different collections of attachable modules.

The modular system further enables parts of the system to be upgraded if newer or more functional or efficient versions of the same module become available after the original purchase, for example, if a more efficient refrigeration module became available.

FIG. 7a is a pictorial view of a FPS consisting of a number of attachable module. The modules attach to the central cooking and preparation module (800) and may consist of modules such as an oven module (1800), storage system modules (7000), a greenhouse module (10000), a dishware storage module (14000), and a dish and food transfer unit/holding unit (15000). In one embodiment, a module could attach to another module (in series) which is attached to the central module, such as an ingredient storage module attached to another ingredient storage module that is configured to pass along ingredients from the second module.

FIG. 7b is a pictorial view of a removable panel (805) on a central cooking module (100) to which another module may be attached. In one embodiment, the FPS is installed with a dummy module (810) temporarily installed in a space where a module is missing as is illustrated in FIG. 7a but without a dishware storage module (14000) and one of the storage system modules (7000). The dummy module can be removed if the FPS owner later decided to replace it with a functioning module.

The central cooking module would be manufactured in different sizes for machines with varying capabilities and throughputs and cost.

In one embodiment, the central cooking module contains the following systems:
Cooking receptacles
Cleaning system
Primary manipulator
Interface for other modules
Control system The other modules attach to the main module. In one embodiment, they receive electrical power and control signals from the main module, and transmit sensor data back to the control system. In another embodiment, the attached modules have independent power connections.

Separating functionality into independently installable modules allows the system to be transported more easily, and allows a larger system to be installed in an existing structure, since it can be deployed in sections that can be moved through existing doorways.

Cooking Receptacle Overview

FIG. 8 is a pictorial view of several cooking receptacles. As depicted, several cooking receptacles (1000) that are used for cooking food are shown. Cooking receptacles are concave containers in which ingredients are cooked and are covered with lids (not shown).

In the preferred embodiment, the cooking receptacles are heated in place from below by integrated heating elements and may also be cooled to chill items within the receptacles by means of coolant circulated in their base.

In one embodiment, the cooking receptacles are built into the main cooking surface and do not move. Items to be cooked are placed in the cooking receptacle from the top and removed from the top, and the cooking receptacles are cleaned in place.

In another embodiment, the cooking receptacles are removable and transportable to a special area for cleaning. In another embodiment, the cooking receptacles are mounted on a rotating pivots which allows them to be rotated to efficiently empty their contents into other containers or onto dishware.

Fixed-in-Place Cooking Receptacle

FIG. 9a is a cross section of a fixed-in-place cooking receptacle (1100). As depicted, the fixed-in-place cooking receptacle includes a cooking surface (1105), a heating element (1110), insulation (1115), a heat transfer medium jacket (1120), heat transfer medium inlet (1125) and a heat transfer medium outlet (1130).

In the preferred embodiment, the cooking surface (1105) is made of a metal sandwich of stainless steel on top to minimize reactions with the food and aluminum on the bottom to enhance heat transfer and promote even temperatures across the surface.

In one embodiment, the cooking receptacle (1100) has a gas inlet (1135) through which steam, heated air, room temperature air, or chilled air may be introduced into the cooking receptacle. In another embodiment, water may also be introduced through the gas inlet (1135).

The advantages of the fixed-in-place cooking receptacle are that it is simple and inexpensive. It is straightforward to connect to electrical power and to the heat transfer medium source. It is easy to clean since it is sealed to the surface of the cooking receptacle. It allows very precise control over the cooking process since the amount of thermal mass the cooking surface and heating elements makes up is low, the receptacle can be heated quickly and precisely, then cooled very quickly by feeding a heat transfer medium such as cooled air or cooled water between the heat transfer jacket and the bottom of the cooking receptacle.

Removable-Liner Cooking Receptacle

FIG. 9b is a cross section of a removable-liner cooking receptacle. As depicted, removable-liner cooking receptacle (1150) includes a removable cooking liner (1155), a heat transfer surface (1160), a heating element (1165), insulation (1170), a heat transfer medium jacket (1171), heat transfer medium inlet (1172) and a heat transfer medium outlet (1173).

In one embodiment, the removable liner cooking receptacle (1150) has a gas inlet (1175) through which steam, heated air, room temperature air, or chilled air may be introduced into the cooking receptacle. In another embodiment, water may also be introduced through the gas inlet (1175).

The removable liner is configured with a interface that the primary manipulator can grasp and use to move it.

The advantage of the removable-liner cooking receptacle is that it is easy to remove ingredients from the receptacle by removing the liner using the primary manipulator and transporting it to where the ingredients need to be placed.

Tiltable Cooking Receptacle

FIG. 9c is a cross section of a tiltable cooking receptacle. As depicted, this tiltable cooking receptacle (1180) includes a heating surface (1182), a heating element (1183), insulation (1184), a heat medium transfer jacket (1185), heat transfer medium inlet (1186), a heat transfer medium outlet (1187), and a pivot (1188).

In one embodiment, the tiltable cooking receptacle (1180) has a gas inlet (1190) through which steam, heated air, room temperature air, or chilled air may be introduced into the cooking receptacle. In another embodiment, water may also be introduced through the gas inlet (1190).

The tiltable cooking receptacle has the advantage of being easy to empty since ingredients can be poured out from a tipped or partially tipped attitude. Also, it is reliable since it is a single piece of hardware that pivots at one point and because the electrical connections and fluid and gas connections are wires and flexible conduits that are connected at time of manufacture and are not connected and disconnected during use.

Cooking Receptacle Surface and Shape

In the preferred embodiment, the cooking surface of the cooking receptacles (1100, 1150, 1180) is made from polished stainless steel. In another embodiment, the cooking surface is selected from the group consisting of: Teflon coating, some other non-stick material, anodized aluminum.

In one embodiment, at least one of the cooking receptacles is not a stainless steel cooking surface but is enamel-covered steel, Teflon-covered metal or glass in order to cook reactive foods such as tomato sauce without picking up metallic flavors when material from the container reacts with the food being cooked.

The cooking receptacles (1000) can be fabricated in different shapes depending on the desired function.

FIG. 10a is a cross section of a flat cooking receptacle. As depicted the flat cooking receptacle (1205) is used for frying foods.

FIG. 10b is a cross section of a deeper cooking receptacle. As depicted, the deeper cooking receptacle (1210) is similar in form and function to a sauce pan or pot and is used for boiling and for cooking soups, sauces, etc.

FIG. 10c is a cross section of a round bottom cooking receptacle. As depicted, the round-bottom cooking receptacle (1215) allows small quantities or large quantities of ingredients to be cooked in the same cooking receptacle at different times with small quantities concentrating at the deeper center. In one embodiment, at least one of the cooking receptacles has multiple heating elements. This allows small quantities of ingredients to be cooked efficiently. The heating element is configured in segments so only the center-most segment is actuated when a small amount of food is being cooked. All segments are powered when cooking is occurring in a full receptacle or if the cooking receptacle is being used as an oven.

In one embodiment, the at least one cooking receptacle electrical heating system is controlled by a power semiconductor, such as a SCR, an IGBT, thyristor, or power MOSFET. Feedback on the resistance of the heating elements is provided to the control system to allow it to estimate the temperature of the cooking receptacle.

Cooking Receptacle Operation

The primary manipulator (2000) delivers ingredients to the cooking receptacle where they can be mixed and wet ingredients added. Heat is then applied and the dish is cooked while stirred, etc. for the appropriate amount of time. Upon completion of the cooking cycle the food is either removed or held in the cooking receptacle where it can be cooled or kept warm.

The cooking receptacle also functions as a mixing bowl for mixing, for rising dough, baking, preparing sorbet, ice cream, custards, etc. The cooking receptacle with the cooling capabilities allows food to be cooked and stored at low temperature until it is ready to be served without moving it from the cooking receptacle.

In one embodiment, cooking receptacles are capable of a baking function when used in conjunction with a lid, allowing a cooking receptacle to function as a small oven. A heating element in the lid (1500) may be employed to provide additional heat from above.

Cooking Receptacle Lid

In the one embodiment, each cooking receptacle is equipped with a hinged lid that that is used to cover the cooking receptacle. The lids hold in vapors during the cooking process and keep things from splashing out of or falling into the cooking receptacles while in use. Lids also increase the energy efficiency of the cooking process by retaining heat that would also be lost to convection. The lid allows simultaneous cooking and cleaning in the cooking area, prevents splashes from leaving the cooking receptacles and preventing drips from falling into what is cooking.

FIG. 11a is a cross-section of a lid. As depicted, the lid (1500) rotates on pivot (1505) to open and close. In one embodiment, it has an electronically driven actuator (1510) to open and close the lid, that is operated by the control system. In another embodiment, the primary manipulator opens the lid.

In one embodiment, the lid is equipped with a fan (1510) to pull in cooking fumes and direct them to the system exhaust conduit. The fan may be connected to the exhaust conduit by a flexible tube, or the fan may be configured to blow the exhaust air toward an opening to the exhaust conduit (1520). In one embodiment, the fan is a squirrel cage type fan.

In one embodiment, the lid has heating elements (1525) for adding heat to food from above with insulation for efficiency and to prevent mechanisms in the lid from overheating. Some of the cooking receptacles may be equipped with a with a motorized drive unit (1530) to drive the stirring tool.

In one embodiment, the lid is equipped with an enclosed jacket (1540) to circulate refrigerated coolant that will enhance the cooking receptacle's cooling capacities.

FIG. 11b is a pictorial view of a lid. As depicted, the lid (1500) is shown in a pivoted-open position.

FIG. 11c is a pictorial view of a lid. As depicted, the lid (1500) is shown in a pivoted-closed position. By using a lid and carefully controlling the heat and blown air and steam input, extremely precise control of the cooking process may be achieved.

Cooking Receptacle Lid Operation Description

In the preferred embodiment, the lids remain closed during most cooking activities. The lids are opened so ingredients may be added or removed from the cooking receptacle and for cleaning.

To cook a dish that needs to be cooked in the open air, such as frying a piece of meat, cool air is blown in through the inlet at the same time the fan is run to suck in the cooking fumes and blow them into the main exhaust system.

To bake items in a cooking receptacle, the lid is closed and heat is applied from above for oven-like operation. The lid heater can also be used to accelerate the heating of ingredients in a cooking receptacle.

Lid Stirring Attachment

A lid stirring attachment allows dishes such as risotto, polenta, and others that must be stirred often or constantly to be prepared without tying up the primary manipulator doing stirring tasks for excessive periods of time which might interfere with other manipulator tasks.

FIG. 12a is a pictorial view of one embodiment of a paddle. As depicted, the paddle (1600) includes a snap-in connector (1605) that connects to the motorized drive unit on the underside of the lid, a drive gear (1610), and stirring blades (1615) that closely move along the edge of the receptacle to move food away from the hot edges. Cooking food is mixed as it moves through the opening (1620). It is driven by a motor in the cooking receptacle lid.

The primary manipulator is used to grasp the appropriate paddle and insert it into the lid drive unit as the lid sits in its open position. The lid is then lowered to the down position where the stirring attachment runs for the appropriate amount of time. The primary manipulator then removes the paddle, cleans it, and places it back into its storage position. This system allows the preparation of stirring-intensive foods like certain soups, polenta, custards, risotto to be constantly stirred as required without being attended by the primary manipulator.

FIGS. 12b, 12c, and 12d are pictorial views that depict various blade configurations for stirring different kinds of food.

Oven Module

In the preferred embodiment, the FPS has a small modular oven module of roughly 2 cubic feet in a short, wide layout. The oven is used for baking dishes such as cookies, bread, pizza, casseroles, roasts, etc. and, in one embodiment, incorporates cooling and chilling capabilities for certain applications. More than one oven module may be built into a single food preparation system.

FIG. 13a is a cut-away cross section view an oven module of the present invention. As depicted, the oven module (1800) includes of low-thermal mass construction and high R-factor insulation (1805) for maximum energy efficiency, steam inlets (1810) to introduce moisture into the oven for certain dishes, primary heating elements (1815), a circulating fan (1820) for convection cooking. A thermostat (1825) controls all heating and cooling functions and liquid heat transfer passages (1840) for cooling so the oven module can double as a cooling unit, allowing food to be held in the oven module temporarily, or the compartment to be used to store food items. Coolant can be passed through the passages to cool the walls of the oven module chamber. An air circulation system can also be incorporated to quickly remove heat from the oven module. The door (1830) is opened and closed by the primary manipulator in the preferred embodiment or by its own actuator in another embodiment. A storage rack (1835) occupying the same footprint as the oven provides storage for the specialized sheets and baking racks it uses.

FIG. 13b is a pictorial view of the oven module. As depicted, the oven module (1800) includes the door (1830), the door latch (1845), the storage rack (1835), and the metal food support rack (1850).

The central controller turns on the oven module and preheats it when a baked item is ordered. Dishes to be baked are brought to the oven module, the door is opened, and the primary manipulator places the dish on the appropriate rack before inserting it into the oven module. The door is closed, and, when the baking cycle is complete, the manipulator removes the dish from the oven module. When called for, the oven module's cooling system is engaged by the central controller. The cooling system utilizing water, water with antifreeze, and air allows the temperature in the oven module to be change quickly, and controlled accurately so any temperature vs. time profile may be applied to an item in the oven module.

Grill Module

In one embodiment, the FPS has an grill module (1900) for grilling meat, vegetables and other foods. In the preferred embodiment, it is fueled by electrical heating elements or, in other embodiments, by natural gas, propane, or possibly other fuels. It also has the capability to burn wood chips or smoke-flavored additives to enhance the flavor of certain dishes. In one embodiment, this module can be mounted extended away from the main FPS cabinet.

FIG. 14 is a cut-away view of a grill module. As depicted the grill module (1900) includes a heat source (1905) which sits below a layer a pumice-like rocks (1910). The flame or temperature level is controlled by commands from the central control system. Above the pumice-like rocks is a metal food support mechanism (1915). Also shown are a closeable grill access door (1925), an exhaust conduit (1930) which directs smoke to the system's main exhaust system, and a combustion air inlet (1935). In another embodiment, a canister for holding smoke material is retractable in and out of the heat source as desired to create wood or other flavored smoke. The heat source can be electric, natural gas or propane.

When a grilled dish is called for, the central controller turns on the grill to preheat it to the desired temperature. The primary manipulator then retrieves the food item from the storage module or the food preparation area and places it on the metal food support mechanism and turns it over as needed during the grilling cycle. A monitoring system controlled by the central controller varies the heating element setting or the flame level depending on how the food is responding to grilling. It also determines the precise time of cooking and command the food to be removed when properly cooked. The grill is then cleaned by the cleaning system.

Having the ability to grill as a function of the FPS allows it to provide the grilled flavor which, for certain dishes, is difficult to duplicate in any other way. The grill thereby expands the flexibility and number of dishes which the FPS can produce.

Manipulator Overview

The primary manipulator is the central apparatus to accomplish most non-cooking tasks in the FPS. It performs the manipulation of the food including the removal of ingredients from the storage area, their placement on the cooking surface, and movement of the food being cooked including mixing, stirring, turning, etc. The manipulator may also be utilized to place cooked foods into the storage area for later consumption and to clean its tool attachments, the cooking surface, and various other components of the device.

Manipulator Mechanism Description

FIG. 15a is a pictorial view of a manipulator. As depicted, the manipulator (2000) is essentially a robot arm designed for cooking. It completes specialized cooking functions by first connecting one of several attachable tools from the tool rack (2005) to the end of the manipulator. In the preferred embodiment, the end of the manipulator contains an electrical motor (2010) which provides rotational motion to the rotational power output (2011) for the tools. The manipulator also has a linear actuator (2012) for operating mechanisms on attachable tools. In a another embodiment, each tool would have a built-in electric motor and would receive power and control data from the manipulator arm.

FIG. 15b is a pictorial view of the manipulator and a tool. As depicted the manipulator (2000) achieves 3-dimensional movement by means of brushless D.C. motors (2015) or stepper motors at each of the joint articulations (2020) and a telescoping extension (2025) for linear movement in at least one of the manipulator segments (2030). In another embodiment linear movement would be achieved through a series of elbow joints.

FIG. 16 is a close-up cut-away view of the manipulator tool attachment point. As depicted, the manipulator tool attachment point (2100) has a grasping mechanism (2105) to physically attach to the tools, a rotary drive (2110), a linear actuator (2115), and a rotary drive motor (2120).

Manipulator Mobile Base

FIG. 17 is a pictorial view the manipulator mobile base that repositions the manipulator for movements to reach points beyond those which the manipulator can reach from a single stationary position. The manipulator mobile base (2200) has two-dimensional movement like an overhead factory crane running on a set of tracks (2210) at the top of the cooking enclosure. The manipulator mobile base (2200) also can be used for detailed movement by using its own movements in conjunction with manipulator (2000) movements. Also shown are power cables (2205). The manipulator mobile base receives power from a cable (2205) or from sliding electrical contacts. The communication can occur over a wire or over a radio link.

FIG. 18 is a pictorial view another embodiment in which the manipulator (2000) has a fixed attachment base (2310) and the cooking surface is configured around it in circular pattern.

Manipulator Operation Description

Handling of Tools

As various tools are used on the same dish, they may be stored in a temporary storage rack (2040) until that dish is completed and they can be washed. The control system keeps track of the location of the tools in their temporary location. After the dish is completed the tools are washed and placed in the main tool rack (2005).

Control Functions

In the preferred embodiment, the individual motors driving each joint have a motor controller which has a power connection and a communications connection and can be commanded by the central control system. The motors also have feedback to allow precise motion utilizing a system such as a Hall effect sensor.

Control of the manipulator motors may occur though signals sent through the power wires (2035) to the various motor controllers or through a separate communications link such as a serial or an Ethernet link. Other embodiments could utilize radio links to communicate with the motor controllers.

Sensors

In one embodiment, the primary manipulator is provided with dual video cameras spaced to allow stereo vision. The cameras are used for picking up dishes, washing dishes, picking up food items, etc. A light is provided to provide illumination.

An electronic nose is used to monitor the gases being produced by the cooking food, and that information is used to guide the cooking process.

Retrieving Dropped Tools

In one embodiment, if the manipulator drops one of the tools, ferrous material in the end of each tool (2045) can be attracted by a magnet (2050) located in the end of manipulator and then lifted back into the tool rack (2005).

Attachable Tools Overview

Attachable tools are devices that are grasped by the primary manipulator and enhance its utility by allowing it to perform many specialized tasks. Common among all the tools is a mechanical interface with the primary manipulator. As described in the section "Primary Manipulator", the primary manipulator has at least one rotational drive and a linear actuator for mechanical activation on the tools.

Attachable Tools Mechanism Description

FIG. 19 shows a roller tool for rolling out cookie dough, pasta dough, and other ingredients into noodles, cookies, pie crust and various other kinds of flattened pastry items. The roller itself (3105) will be approximately 4.5 cm in diameter and approximately 15 to 20 cm long. The diameter will decrease at the ends (3110) and smoothly taper off. It will have two connections (3115) at either end on which to role freely. The top (3120) connects to the primary manipulator.

FIG. 20 shows a scoop for lifting and moving ingredients.

FIG. 21 shows a blender for blending ingredients in a cooking receptacle or other container. The rotational motor in the manipulator drives the blade (3305) of this tool through a drive shaft (3310) running through the middle of the tool and is used for any kind of mixing or blending of sauces, creamed soups, dips, drinks, etc.

FIG. 22 shows a spice cage for flavoring dishes in which the spice such as bay leaves, cinnamon, cloves, etc. and are not intended to be left in the finished dish. The spice is placed in the screened compartment which is then placed in the cooking dish and left there for an appropriate length of cooking time. The spice cage is then removed by the grasper or the manipulator magnet. This saves the trouble of trying to locate, identify, and retrieve such spices if they had been placed directly into the dish for later individual removal.

FIG. 23 shows a multi-articulated grasping tool. It has no electrical connection to the main manipulator but instead is battery-powered. It has a grasping unit operated by an electric motor (3505), a radio unit (3510) to communicate with the main control system, a waterproof skin (3515), and an inductive charging system (3520). In another embodiment it has a contact-based charging system.

FIG. 24 shows a pasta basket for cooking and draining pasta and other items that are to be boiled and drained after cooking. It can also function as a steamer basket. The basket is loaded first in the food preparation area with the ingredients to be cooked. It is then transported to a cooking receptacle and is cooked in or above boiling water. After cooking is complete, the basket is removed leaving the water behind and the cooked food is moved back to the food preparation area for further handling.

FIG. 25 shows a cutter tool similar to a pizza cutter. This tool incorporates a rotating blade (3705) and is used to slice thin items like cookie or pastry dough, meat slices, etc. on the food preparation area surface.

FIG. 26 shows a chopper blade. This tool is used to chop ingredients using downward thrusts onto the food preparation area surface or inside a special container.

FIG. 27 shows a spatula used for lifting and turning items.

FIG. 28 shows an attachable fork tool.

FIG. 29 shows a simple grasping tool. This tool is for grasping of objects.

The pinching fingers (4105) oppose each other and are activated by the manipulator arm to secure and release the object being grasped.

FIG. 30 shows a spark generator for igniting flames for "flambé" dishes.

FIG. 31 shows a temperature probe. This tool can be used to measure the temperature of ingredients while cooking or those in the process of cooling down or warming up.

The thermometer may be placed into a cooking receptacle to measure the temperature of the cooking ingredient, or it may be inserted into a piece of roasting or cooking meat to measure its internal temperature.

The temperature probe consists of a low-thermal-mass tip (4305) with a temperature probe that quickly reads the temperature of whatever it is put into. It consists of a thermister or any kind of electronic temperature reading device. It is calibrated by placing it into boiling water.

In another embodiment the temperature probe is a radio thermometer equipped with a rechargeable battery, radio transmitter, and a temperature measuring sensor, and a ferrous attachment so it can be retrieved by the manipulator arm. In another embodiment, it is simply grasped by the grasping tool.

FIG. 32 shows a mixer attachment.

Ancillary Systems Overview

Ancillary systems including water heating, the main electrical power system, the primary control system, the water filtration system, a liquid drain system, a waste disposal system, and a ventilation system. In one embodiment, a window into the cooking area would allow observation of the cooking process from outside the enclosure cabinet.

FIG. 33 is a cut-away schematic view of the ancillary systems. As depicted, there are a number of ancillary systems shown that support the main food preparation and cleaning activities. Not including the primary control system, the ancillary systems include a:

water heating system (6005)
main electrical power system (6010)
water filtration system (6015)
liquid drain system (6020)
solid waste disposal system (6025)
ventilation system (6030)
viewing system (6035)
video system (6040)

The primary control system controls the ancillary systems in generating hot water, removing cooking fumes, etc.

Water Heating System

In the preferred embodiment, the water heating system heats filtered water so it may be used for cooking.

Main Electrical Power System

In the preferred embodiment, a electrical power system converts line power into voltages required for the various subsystems and distributes it. It controls the power to the cooking units using solid state switching devices. In the preferred embodiment, solid state switching devices are used throughout.

Water Filtration System

In the preferred embodiment, a reverse osmosis water filtration system is used to filter water used for cooking and cleaning.

Liquid Drain System

The liquid drain system drains the cooking area, the food preparation area, and the feeds from the pump suction systems. It has a grinder to grind solid waste matter in the waste water similar to an in-sink food disposal.

Solid Waste Disposal System

The solid waste disposal system stores trash. In the preferred embodiment, it also compacts trash, but because of the nature of the system, very little trash is generated. The system separates recyclable items into separate bins.

Ventilation System

The ventilation system exhausts cooking fumes outdoors. In another embodiment, it employs an air to air heat exchanger to warm the incoming air using the exhaust air.

Viewing System

The viewing system consists of at least one clear window that allows observers to see what is happening inside the FPD. In the preferred embodiment, the window blocks UV light, so the UV light used to clean the unit does not present a danger to observers. In the preferred embodiment, it incorporates its own cleaning system for the interior surface of the window.

Remote viewing is also accomplished by sending the video feed from the internal video cameras to a remote video display.

Video System

The video system is used by the control system to monitor and perform tasks, and also lets remote viewers watch the process.

Fire Suppression System

The device has a fire protection system, and a fire detection system, and shuts down heat when fire is detected. The device continues to operate the water system in case it can be used to put out the fire. In one embodiment, a nitrogen based fire extinguishing system is employed, along with water spray.

Waste Handling System

The FPS has its own internal waste handling system for removing, and, in some cases temporarily storing, both liquid and solid wastes.

FIG. 34 is a schematic cut-away view of the waste water system. As depicted, the waste water system (6800) includes a grinder (6805) for grinding up solids mixed with the water and other liquids generated by the cleaning system. This grinds food scraps into small particles so they can be washed down the drain without risk of clogging the pipes (6810). This system ends at a connection point (6815) with the building's sewage plumbing system.

In another embodiment, a screen basket (6820) that can be picked up and emptied by the main manipulator catches large items before they are washed down the drain and places them with the solid waste.

FIG. 35 is a pictorial schematic of the solid waste handling. As depicted, the solid waste handling system (6900) comprises an opening to an electronically operable door (6905) from the main cooking enclosure through which solid food waste passes and is placed in a storage container (6910). In one embodiment, this waste storage container is kept at a cool temperature until such time as it can be disposed of by the operator through an access door (6920).

In one embodiment, a trash compaction unit compresses any paper and plastic waste into a special holding area. Sensors monitor the amount of trash and alert the user to remove it when it approaches a full level. In another embodiment, the trash system has a special area to temporarily hold recyclable waste like metal cans which have been dropped into it by the main manipulator after having been opened.

In another embodiment, reusable food trimmings are placed in a food container and where they are stored for making soup and gravy stocks. In another embodiment, a special compost container is provided for storing in the refrigerated storage unit any food scraps that may effectively be turned into garden compost.

The waste holding areas are sealed air tight, and a slight negative air pressure is applied to prevent waste odors from contaminating the rest of the FPS. The negative air pressure is applied through a line (6915) to the exhaust system.

The handling of trash is ordered according to a preferential hierarchy. Any reusable vegetable trimmings that might be suitable for making soup or gravy stock are handled and stored first. Those that are not but are suitable for composting are moved to the compost container. Appropriate solid waste is directed to the recyclables container. Remaining waste is placed in the main waste area or allowed to pass down the drain if liquid.

The advantages of this system are that it compacts trash for more efficient space utilization and to minimize the requirement for the user to be remove it, minimizes or eliminates foul odors by keeping wastes cool, and separates wastes according to the users' requirements like the need to recycle certain wastes.

Storage System

FIG. 36 is a cut-away view of a storage module. As depicted, the storage module (7000) an outer cabinet (7005), rotating shelves (7010) and an access door (7015), and an optional cooling system for a refrigeration storage unit. The various food ingredients are stored in their own individual storage containers and retrieved through an access door (7015). The storage system stores raw ingredients, leftovers, and pre-cooked ingredients. It is designed to provide quick access to the primary manipulator for the removal and replacement of ingredients.

FIG. 37 is a side view cutaway of one embodiment of a storage module. As depicted, the storage module (7000) comprises several independent rotating shelves (7105). Each shelf has its own motor (7110) to allow independent operation.

FIG. 38*a* is a top view of a storage module. As depicted, there are shelves consisting of three independently-rotating, concentrically-mounted shelves (7205) each of which can be independently rotated to allow access to the middle and back ring through gaps (7210) in the two outer sections. In order to reach into the inner shelves, gaps are maintained on the outer shelves so the inner shelves can be accessed through the gap. During access by the primary manipulator or the shuttle system (7500) through the access door (7215), the shelves are rotated so the gaps line up in front of the item to be accessed in order to retrieve storage containers and replace them in the storage module.

FIG. 38*b* is a top view of a storage module rotating shelf. It illustrates how the shelves are aligned to allow access through the gap. The advantage of such a system over a single rotating shelf is that there is no need to move items stored on the outside of a shelf because of easy access to items stored on interior shelves through the gap. This offers unobstructed access to items increases the throughout of ingredients into and out of the module. To increase throughput, the most commonly used ingredients are stored in the outer ring, while the less frequently used ingredients are stored on the inner rings.

FIG. 39 is a top view of a storage module rotating shelf with two concentric independently rotating shelves. It is essentially the same configuration shown in FIG. 72 but has two concentric ring sections rather than three.

In one embodiment, the user loads ingredients into the module through an access panel (7215). In another embodiment, the storage system is configured to be loaded from an automated system that accesses the system from the outside of the dwelling.

FIG. 40 is a pictorial view of the manipulator accessing a storage module. As depicted, the primary manipulator (2000) is reaching into a storage module (7000) to access an ingredient.

Storage Unit with Internal Retrieval System

FIG. 41*a* is a pictorial cut-away view of a storage module with an internal retrieval system. As depicted, in this embodiment each storage module (7000) has its own built-in retrieval system (7500). A shuttle (7505) rides on an elevator rail (7510) for positioning at the proper shelf level where it stops and shuttle's ingredient grasper (7520) extends inward to the correct ring section to retrieve the desired storage container. The shuttle transports the container to an access door (7515) through which it is accessed by the primary manipulator.

FIG. 41*b* is a top view of a storage module with a internal retrieval system.

FIG. 42 is a top view of a storage module equipped with two shuttle system which doubles features depicted in FIG. 75. This system would work well with a system with independently rotating shelves as depicted in FIG. 71.

FIG. 43 is a pictorial cut-away view of a storage module equipped with a transfer shelf. As depicted, the transfer shelf (7705) allows the control system to retrieve and stage ingredients to be used in a dish which is scheduled for immediate preparation on a convenient outer shelf for faster access of the ingredients by the manipulator through an access door (7710).

Liquid Storage Container

FIG. 45 is a cut-away side view (left) and pictorial view (right) of a liquid storage container. As depicted, the liquid storage container (8000) includes an outlet spout (8005), a lid (8010), a transparent strip (8015) for monitoring liquid contents (8050) a flow control mechanism (8040), an attachment flange (8030) from which the manipulator picks it up, and a rim (8020) to rest the container on the rack of the food storage unit. The liquid storage container (8000) is used to store liquids, such as milk, soup stocks, liquid condiments, etc. The container has a lid (8010) which is removed by the system so liquids can be added without human assistance. In the preferred embodiment, the lid would have a magnetic actuator to secure it to the container.

The container is made from impact-resistant, food-grade plastic such as polyethylene. It could also be made from a Lexan-like material to minimize the possibility of taste changes from chemicals leaching from a plastic container. The containers could also be made from stainless steel.

In the preferred embodiment, the containers have a unique identifier (8035), such as a bar code, that a vision system uses to identify it. In the preferred embodiment, the control system uses a database to remember what is in each container and the container's location. The barcode would be a backup to make sure it does not get confused, for example, in a situation where the user changed the location of containers in the storage area. In another embodiment, a RFID (Radio Frequency ID) chip is used to identify containers. The vision system can monitor the contents by looking at the strip and determining the liquid level. It can also place the container on a scale, and calculate the amount of ingredient inside by subtracting the container's weight from total weight.

FIG. 80*b* is a side view cut away of a detail of the outlet spout. As depicted, the outlet spout (8005) includes a flow control mechanism (8040). In one embodiment, this is a pressure clamp (8060) around a flexible tube operated by the dispensing tool. In another embodiment, the flow control mechanism consists of a valve (8070) such as a ball valve and an operating interface (8065) to the dispensing tool.

FIG. 52 is a side view cut away view of a liquid ingredient dispensing tool. As depicted, the liquid ingredient dispensing tool (8400) includes a connection interface (8405) to the primary manipulator (2000), a rotary drive connection to the container holding mechanism (8410), and a container grasping mechanism (8415). In the preferred embodiment, the container grasping mechanism clamps around the container by means of a gear-driven drive. The flow control force transmission mechanism (8420) transfers force from the primary manipulator's (2000) linear actuator to the flow control mechanism drive (8425).

FIG. 53 is a top-view cut-away of the connection interface of the liquid ingredient dispensing tool. As depicted, the connection interface (8405) comprises a container grasping mechanism (8415). It shows the force transmission mechanism from the primary manipulator rotary drive to the grasping mechanism (8415) arms which rotate on pivots (8430).

Ingredient Storage Container

The majority of dry ingredients are stored in individual storage containers which are, in turn, kept in the storage modules. Containers can be made in various sizes and configurations with larger sizes for ingredients such as flour and smaller ones for ingredients such as spices.

FIG. 46 is a pictorial view of a storage container (8100). As depicted, the container has a storage body (8102), a removable lid (8105), and a base (8110) which allows it to stand upright on a flat surface. The container also has an attachment point (8115) from which the manipulator picks it up and a rim (8120) to rest the container on the rack of the food storage module. Each container also incorporates an ID label (8125) so the control system can identify which ingredient is contained in which storage container.

Containers containing food ingredients are stored in the storage system. When the control system determines that a certain ingredient is required for a dish, it commands the storage system to retrieve the appropriate storage container. The storage container lid is removed, the primary manipulator equipped with the appropriate retrieval tool then removes the required quantity of the ingredient from the container, and returns the container to the storage module. The storage containers are washed using the cleaning system as needed.

FIG. 47 is a cross-section side view of one embodiment of the lid (8105). As depicted, the lid includes a magnetic lid release actuator (8130) of a ferrous plate (8135), a spring (8140), and mechanism (8145) to transfer the holding force to the edge of the lid. This system allows the lids to reliably and easily be removed. To remove a lid, the primary manipulator moves the container over to a electromagnet, which is activated to release the lid and hold it while the container is in use. When the container is ready to be placed back in storage, the manipulator presses it into the lid again, and the control system deactivates the electromagnet.

Viscous Ingredient Container

Viscous ingredient containers are used to store and dispense more viscous ingredients such as butter, curry pastes, peanut butter, thicker sauces, etc. A dispensing tool is operated by the primary manipulator to dispense from the containers such ingredients as needed in their proper amounts.

FIG. 48 is a cross sectional view of a viscous ingredient container. As depicted, the viscous ingredient container (8200) includes a tubular bottle (8205) with an internal piston (8210) on one end to urge the ingredient (8215) out of the nozzle (8220). It is similar in design to a tube of construction caulk or adhesive.

FIG. 49 is a cross sectional view of three embodiments of nozzles. Depicted are a pressure clamp (8225), a removable lid (8230), and a retractable lid (8225). The pressure clamp (8225) operates by maintaining enough pressure to keep the ingredient from leaking out, but not enough to prevent it from being expressed with pressure from the internal piston (8210). The removable lid is removed by sliding it horizontally into a lid removal fixture and pulling the container away vertically. The retractable lid is pushed aside by pressure from the ingredient being dispensed.

FIG. 50 is a cut-away view of the dispensing tool. As depicted, the dispensing tool (8300) includes a connection interface (8305) to the manipulator (2000), a rotary drive connection (8310), a piston driver (8315), and a tube grasping mechanism (8320). In the preferred embodiment, the tube grasping mechanism snaps around the tube.

FIG. 51 is a bottom view of the dispensing tool with a viscous ingredient container. As depicted, the dispensing tool (8300) comprises a piston is driven by a gear driven by the rotary power connection of the primary manipulator (2000).

In the preferred embodiment, the volume of ingredient being dispensed is monitored by a video monitoring system that senses a marking pattern on the side of the piston driver. In another embodiment, the ingredient is measured by the number of revolutions performed by the rotary drive moving the piston driver, or a combination of the two methods.

Viscous Ingredient Container Operation Description

When such an ingredient is needed, the manipulator picks up the dispensing tool and retrieves the appropriate viscous ingredient container from the a storage unit. After moving to where the ingredient is required, the piston drive is actuated far enough to dispense the desired quantity of ingredient. The container is then returned to the storage area. When a container is empty it is delivered to a point where it can be washed and/or refilled by the operator.

In referring to FIG. 82*b*, tip (8225) has a top (8226) which is opened by the force of the ingredient being pressurized by the piston and opening a spring clamp in the tip. The tip (8230) has a top (8231) which is temporarily held and replaced by a special tool mounted on the cabinet wall and onto which the primary manipulator forces the container to remove and replace. The tip (8235) has a top (8236) which is pushed aside by pressurized ingredient to allow it to be dispensed.

The system operates with tubes that are either be purchased pre-loaded with ingredients and are disposable or with other reusable tubes can be washed by the automated cleaning system and reloaded with ingredients by the user. The advantages of such a system are its reliability and simplicity, and the minimal amount of cleaning required during routine use.

Ingredient Preparation Area and Tools

The food preparation area is where ingredients are chopped, combined, washed, and prepared to be cut, etc. Special tools are employed for this task all of which are designed to be easily cleaned.

FIG. 54 is a pictorial view of several the food preparation area and several tools. As depicted, the food preparation area includes a cutting surface (9010), two mixing containers (9015), an ultrasonic knife (9020) attached to the primary manipulator (2000), a vegetable cleaning bath (9025), a water spray outlet (9005), a scale (9030), a grasping apparatus for holding food items (3500). In one embodiment, an special ingredient processing manipulator is employed. In another embodiment, the primary manipulator would perform the cutting and chopping itself. In either embodiment, attachable tools would be employed.

FIG. 55 is a pictorial view of the food rinse basin. Food items are placed under water spray outlet (9005) and the water spray (9105) is activated thus spraying off the food item (9110). The water spray is activated by the control system.

FIG. 56 is a pictorial view of a vegetable being washed in an ultrasonic wash bath. As depicted the vegetable (9205) is being washed in the ultrasonic wash bath (9025) by the ultrasonic transducer (9210) which generates ultrasonic sound waves in the water to dislodge dirt, chemicals, or debris from the food item being washed. After being receiving an ultrasonic bath, the item is rinsed.

Cooking Process

The cooking process begins by preparing and assembling the ingredients ("mise en place" in conventional cooking lingo).

The knives used in food preparation can be standard knives, vibrating knives, or ultrasonic vibrating knives. The knives may be very thin and lightweight, which makes it easier to drive the vibration and easier to cut small radius curves.

A scale is utilized with a plate that is sealed into the cooking preparation area surface. It is a compliant seal that allows the scale to move but prevents water and other material from getting between the scale and the base.

In one embodiment, the measuring is done using bowl sitting on the scale. The scale would calibrate to zero after the container is placed on the scale so it could accurately measure the ingredients. For dry ingredients, it may make multiple passes from the ingredients container to the measuring bowl. The measuring system would first start with larger quantities of ingredients, and switch to smaller quantities as it neared the amount of ingredient required.

Certain dishes may not require the measuring bowl, but ingredients would be measured out directly into the cooking receptacle to minimize cleaning steps required. In this case, the ingredients would not be weighed but would be measured by volume and dropped directly into the cooking receptacle.

The food preparation area also contains a grasping device for holding vegetables while they are being cut. This would allow them to be firmly grasped so the manipulators using a knife could cut them into the proper sized pieces.

Another food preparation tool is a grinding tool which would be used for making things such as pesto, and other items that require being pounded in a mortar and pestle. In one embodiment, the grinding tool consists of an attachable tool with one half of a grinding wheel, that mates with a stationary stone bowl built into the preparation area.

The cooking area would have the capability of breaking eggs, separating yokes from whites, and mixing ingredients either in the cooking receptacle or in separate mixing bowl.

In one embodiment, a mixing system with a mixing bowl is used to knead dough. The bowl detaches from the mixing system so ingredients may be transferred to cooking area.

Another tool would be a dough kneading tool. This would be used to knead bread and pastry dough. The machine would not be designed for producing large quantities of bread but would be capable of making relatively small amounts required for pizza crust, rolls, and small loaves of bread, pastries, and specialty bread such as focaccia, ciabatta, and other "artisan" breads. If a larger quantity of bread is desired, the system would produce and store the dough and then bake it all just prior to the meal or it would make the bread and store it until needed.

In one embodiment, an attachable mixing system could be employed which would be used to prepare bread dough and ingredients that require mixing. This would free the primary manipulator from having to do this task and increase the overall throughput.

Finally the system cooks the required dishes from the prepared ingredients. The system uses feedback to careful control the heat input while monitoring the temperature of the cooking receptacle surfaces. Using careful mathematical modeling of the heat transfer to the food as well as data from previous times the food was prepared, the timing and heat input is controlled. Using the cooling capabilities of the cooking receptacle, the food may be held there and reheated before being served, or served immediately. Using mathematical modeling of the heat transfer and feedback with precise control of power input, allows for very repeatable cooking procedures with high quality food as a result.

Examples of Specific Foods

If, for example, a chicken fried steak is being prepared, the FPS mixes the ingredients for the batter to cover the steak into a cooking receptacle and mixes them together. It puts oil into another cooking receptacle for the frying. It dips the steak into the cooking batter, then places it into the frying oil. It monitors the temperature of the oil continuously and cooks the meat until it was done based on time and a mathematical model to model the heat transfer and heuristics based on previous dishes of the same type prepared.

Another example, is the preparation of muffins. The FPS mixes the batter with all the dry ingredients and wet ingredients in a cooking receptacle. It then uses the scooping tool to transfer the batter into a muffin baking pan. The baking pan is sprayed with oil before the batter was transferred, and is placed in the oven compartment and baked for the appropriate time.

If something more complex, such as salmon over polenta with vegetables is requested, the cooking machine carefully schedules the various tasks required to complete the cooking of the dish. It first cooks the polenta by first cooking an appropriate vegetable stock ahead of time then carefully cooking the polenta combined with stock while stirring periodically. Either during this process or afterward, the FPS cooks the salmon and vegetables. The salmon could be either grilled on the grill or baked in a cooking receptacle. The control system visually inspects the salmon, measures its size, and brings it to a known pre-cooking temperature. During the cooking process, it models the heat transfer to the piece of meat in order to cook it to the exact level of doneness. It combines the modeled heat transfer calculations with measurements of previous cut salmon as well as input from users to determine the cooking time. The vegetables are cooked in a separate cooking receptacle with seasonings added as necessary. The items are then placed on individual plates or serving dishes to be served.

A further example is a stir fry. To prepare the dish, the system first prepares all the ingredients so they can be added rapidly to the stir fry. This is scheduled with substantial time prior to when the dish is required. The vegetables are washed and chopped, the meat is sliced into small pieces, and any sauce or premixed liquid ingredients are mixed in a temporary storage container. Next, a cooking receptacle is used to fry the dish with the ingredients in the proper order while being stirred by the primary manipulator. The dish is scooped out using the scooping tool into a serving bowl. If rice is desired with the stir fry, it is cooked independently in another cooking receptacle and timed to be ready at the required time.

If stuffed Cornish game hen is requested, the device retrieves the bird, thaws it if necessary, and rinse it off. It cooks any stuffing if required and stuffs it into the bird, then places it in a cooking receptacle or the oven compartment. Because of the dexterity required to stuff a bird, the system would use a viscous ingredient storage container filled with the stuffing material, and express it into the cavity of the bird. Next, the vegetables and side dishes are cooked. The items are then placed on individual plates or serving dishes to be served.

Dry Ingredient Measurement and Transport Tool

In the preferred embodiment, a tool for granular, ground or powdered dry ingredients is used to transfer them from their storage containers and accurately measure them out as needed for specific dishes. These tools come in various sizes. In another embodiment, such dry ingredients are transferred and measured using more conventional spoons and scoops.

FIG. 57 is a partial cut-away side view of a dry ingredient measurement and transport tool. As depicted, a dry ingredient measurement and transport tool (9500) includes a tubular outer shell (9505) with a piston (9510) that travels inside it, a closeable cap (9515), and a mechanical interface (9520) that allows the tool to be grasped by the primary manipulator (2000). The rotary drive of the primary manipulator (2000) drives the piston, and the linear actuator (2012) controls the opening and closing of the closable cap (9515). When a dry ingredient of this type is required, the primary manipulator removes its storage container from the storage area and places it in a temporary holding rack in the food preparation area. The primary manipulator (2000) then connects to the dry ingredient measurement and transport tool (9500), and the piston is adjusted so the volume between the piston (9510) and the end of the tube is the same as the desired volume of the ingredient. The manipulator (2000) moves the tool to the mouth of the storage container where it is pressed down into the ingredient and forces the ingredient into the tube. It may be pressed several times at different points in the mouth of the container to attain the desired density and volume. The cap then closes to hold the ingredient in place during transport. The tube is then moved to the destination where the ingredient is required, and the piston is activated to push the ingredient out of the tube. The tool can measure precise amounts of ingredients, and can measure and transport a large variety of ingredients.

Scoop and Spoon Transfer Tools

FIG. 58 is a side view cut away view of two dry scooping tools. As depicted, a number of scoops (9605) and spoons (9610) are used to measure and transport dry ingredients rather than the dry ingredient measurement and transport tool. The scoops and spoons are similar to conventional measuring spoon and scoops but have a mechanical interface (9615) which allows them to be grasped and manipulated by the primary manipulator.

FIG. 59 is a side pictorial view of a greenhouse module. As depicted, the greenhouse module (10000) includes growing plants (10002), a rotating carousel platform (10001), full-spectrum grow lights (10005), a watering system (10010), and a harvesting system (10015).

Greenhouse Module

The greenhouse module is for growing a selection of culinary herbs and possibly small chilies and other vegetables for enhanced flavor and additional variety at a relatively low cost. Herbs such as basil, thyme, rosemary, cilantro, chives and others are grown fresh, autonomously harvested, and added to the dishes that call for them.

FIG. 100 is a side pictorial view of a greenhouse module. As depicted, the greenhouse module (10000) includes growing plants (10002), a rotating carousel platform (10001), full-spectrum grow lights (10005), a watering system (10010), and a harvesting system (10015).

In another embodiment, a small fan (10030) creates a slight negative pressure when the door is closed to prevent greenhouse air from getting into the rest of the device and vents through an exhaust port (10031). In another embodiment, a larger fan (10035) provides artificial wind to promote plant growth and health. In the preferred embodiment, the plants are grown in conventional planting pots. In another embodiment, they are grown hydroponically in a nutrient solution.

Mounting Locations

FIG. 60 is an open pictorial view of a greenhouse module. As depicted, the greenhouse is mounted it above one of the storage units (7000). In another embodiment, two greenhouses could be employed, one mounted above each storage unit.

FIG. 61 is a pictorial view of a possible alternate position for a greenhouse module. As depicted, the greenhouse module (10000)is extended into the room or through the wall to the outside of the house. Glass windows (10205) allow for either viewing from inside the house or for natural light to enhance herb growth if extended outside the house.

FIG. 62 is a pictorial view of another option for inside mounting. As depicted, in this configuration the greenhouse module (10000) has a countertop (10305) covering its upper surface to both protect it and provides additional countertop kitchen space.

FIG. 63 is a pictorial view of another embodiment for mounting. As depicted, the greenhouse module (10000) is configured as a long, narrow module that would extend the length of the entire device. The plant pots are placed on a rotating belt or track that allows them to be moved in front of the access door. The narrow module contains grow lights and a watering system. The watering system does not need to be mobile because the plants are on a linear track and each plant passes under a given spot where the water outlet is located.

FIG. 64 is a top view of a greenhouse module track system. As depicted, the greenhouse (10000) comprises a rotation system on which the herb plants would move on a linked belt or track (10405) on their own individual pads (10415) and stop at an access door (10410) when needed for harvesting. The advantage of this embodiment is that the primary manipulator has easy access to any plant in the module.

Greenhouse Operations Description

FIG. 105*a* is a pictorial cut-away view of a harvesting system. As depicted, the harvesting system is comprised of an access door (10505) through which the manipulator arm extends and uses a plant snipping tool (10510) to hold and clip the sprigs of herbs to be harvested.

FIG. 65 is a pictorial cut-away view of a harvesting system. As depicted, the harvesting system is comprised of an access door (10505) through which the manipulator arm extends and uses a plant snipping tool (10510) to hold and clip the sprigs of herbs to be harvested.

FIG. 66 is a top view of the rotating carousel platform. As depicted, the rotating carousel platform (10001) is the mechanism on which the planted herb plants sit and are rotated into position for harvesting. If the carousel consists of more than one rotating ring, a slot (10515) in the outer ring (10520) allows the primary manipulator (2000) access into the inner ring when properly positioned with the empty gap location in front of the access door.

FIG. 67 is a top view of another embodiment of a small harvesting mechanism, As depicted, the harvesting system (10605) is integrated into the greenhouse itself. The system clips the herbs and transfers them to the primary manipulator (2000) by either dropping them through a chute (106010) or by handing them off through an access door (10615) in another embodiment.

FIG. 106b is a pictorial exposed view of another embodiment of a harvesting system. As depicted, a small harvesting mechanism (10620) is mounted on an overhead crane (10625) for access into the inner plants. A visual sensor that is built into the harvesting mechanism guides either the primary manipulator or the greenhouse integrated harvesting mechanism to the proper position to harvest the plants. Communication with the main controller occurs over a radio link or over a wired connection.

Cleaning System

In the preferred embodiment, the FPS is provided with an autonomous cleaning subsystem. The cleaning subsystem is used to clean the interior surfaces of the device, the cooking receptacles, the attachable tools, the cleaning tools, the viewing window and possibly other items.

The cleaning system primarily employs the manipulator to perform an array of cleaning tasks utilizing various specialized attachable cleaning tools. It also uses ultra-violet lights, ultrasonic cleaning baths, and a wash area for cleaning tools and containers.

Attachable Cleaning Tools

In the preferred embodiment, a selection of attachable tools for cleaning are provided. These include a spray tool, a spray/brush tool with a water reservoir or conduit, a spray brush tool with a water hose or reservoir, a polishing tool, and a transportable ultra-violet light. A short description of each follows.

High-Pressure Spray Tool

FIG. 69 is a pictorial view of a high-pressure spray tool. The high-pressure spray tool (11000) is comprised of a water hose (11005) the end of which is grasped by the primary manipulator (2000) and used to spray off the interior of the food preparation device and clean in-place various components. A pump (11010) driven by the rotational power output (2011) on the primary manipulator (2000) and creates a high pressure spray of water (11015) from the nozzle (11020). In another embodiment, the water is provided at high pressure so the pump is not needed.

Spray Brush Tool with a Reservoir

FIG. 70 is a pictorial view of a spray brush tool with a reservoir. The spray brush tool with a reservoir (11100) is grasped by the primary manipulator (2000) and contains a refillable cleaning fluid reservoir (11105), a pump (11110), a valve (11115) operable by the manipulator, a nozzle (11120), a cleaning fluid inlet (11125) to refill the reservoir (11105). The spray brush allows cleaning to be accomplished without the need of a hose.

Spray Brush Tool with a Water Hose

FIG. 71 is a pictorial view of the spray brush tool. As depicted, the spray brush tool (11200 includes a feed line (11205) to spray the surface to be cleaned, a drain line (11210) to pick up waste liquid following cleaning, a pump (11215) activated by switch (11230) which is engaged by the linear actuator on the primary manipulator (2000) and driven by the rotational power output (2011) to spray liquid through the nozzle (11225) and to suction away waste fluid, and a spinning brush (11220) to remove food from the surfaces being cleaned. In the preferred embodiment, the brushes have heat-resistant bristles that are not damaged by the heat of the cooking receptacle. A check-valve prevents waste water from draining back out of the drain hose when the pump is not operating.

Polishing Tool

FIG. 72 is a side cut-away view of a attachable polishing tool. The attachable polishing tool (11300) buffs the interior steel surface of the cooking receptacles. It is important that the cooking receptacle surfaces retain a high gloss to minimize the sticking of the food. The polishing tool consists of a rotating disk or head (11305) with a compliant surface (11310) and is driven by the rotational power output (2011). It is dipped in polishing compound and pressed against the surface. After the polishing process (that may consist of multiple compounds and multiple polishing steps) is complete, the cleaning system rinses the cooking receptacle and the attachable polishing tool.

UV Sanitizing Light Tool

FIG. 73 is a side view cut-away of a transportable UV sanitizing light. As depicted, the transportable UV sanitizing light (11400) includes a bulb (11405) which is protected from breakage by a protective housing (11410), It is placed close to the surface of the cooking receptacles as a final step in the cleaning process to kill microorganisms on the surfaces especially those that are hard to reach by the stationary UV illumination system. In one embodiment, power for the light is generated by a small generator turned by the rotational power output (2011) on the manipulator (2000). In another embodiment, it is powered by a rechargeable battery.

Tool and Dish Cleaning Area

FIG. 74 is a side cut-away view of the tool and dish cleaning area. The tool and dish cleaning area (11500) includes a wash basin (11501) and a rinse basin (11502) in which tools are cleaned while remaining attached to the primary manipulator (2000). In one embodiment, the brushes (11505) in the wash basin rotate rather than remain stationary. This enhances the cleaning of the tools immersed in the soapy water (11510). Tools are rinsed in the rinse basin (11515).

In one embodiment, the cleaning basin (11500) is drained from a drain at the bottom. In another embodiment, the manipulator suctions away waste water as needed.

Water Hose System

FIG. 75 is a pictorial cut-away view of how the cleaning system that utilizes hoses. As depicted, the hose assembly (11605) includes a hot water conduit (11610), a soapy water conduit (11615), and a waste water suction conduit (11620) grasped and operated by the primary manipulator (2000). The hose is suspended from the top of the cooking enclosure. The looped hoses in allow the system to move the end of the hose to the far corners of the enclosure and to rest against one wall of the enclosure when not in use.

In another embodiment (see second image), a spring-loaded cable retractor attached to point on the hose allows additional slack so the hoses can reach any point in the enclosure.

Cleaning System Operation Description

The cleaning process is scheduled by the central controller to perform cleaning tasks as soon as possible but also to accomplish them in such a way as to most efficiently utilize resources and the attachable cooking and cleaning tools and to also not interfere with any cooking processes which may be occurring concurrently. Non-routine cleaning tasks, like that of the interior walls, would be scheduled based on elapsed time, usage of the system, the type of foods that had been cooked and other visual variables monitored by the central controller. In the preferred embodiment, a video camera system monitors the progress of the cleaning system and determines when an area is clean or needs additional cleaning.

Cooking Receptacle Cleaning

In the preferred embodiment, the spray brush tool (11200) is utilized to remove the bulk of cooking debris from the receptacle surface. In another embodiment, the cooking receptacle cleaning system first sprays cold on the surface followed by a very hot water spray combined in both cases with a scrubbing action. This is followed by a soapy spray and scrubbing followed by rinsing. After each of these phases, a suction device is used to remove waste water from the cooking receptacle.

In another embodiment, a conduit for air, steam, and hot water runs under the lid of the cooking receptacle to assist in cleaning cooked-on food deposits from the surface of the cooking receptacle. Steam and hot water pass through the conduit onto the cooking receptacle to soften deposits prior to the cleaning process. This allows the cleaning process to be accelerated since the manipulator may be occupied with other tasks.

In one embodiment, hot water is passed through the cooling/heating passages in the cooking receptacle. In another embodiment, the heating element within the cooking receptacle is utilized to enhance the cleaning process by heating water to high temperatures.

Steel Polishing Process

On a non-routine basis the central controller orders the polishing of the cleaning receptacle surfaces to enhance their non-stick properties. It directs the polishing tool to buff the surfaces with polishing compounds. The polishing compounds are stored in the ingredient storage modules.

Tool and Dishware Cleaning System

In one embodiment, a tool dishware cleaning system first quickly rinses away large attached items of food. The dishware is then stacked in a special holding area which is kept at a warm temperature where it is periodically sprayed with warm water. After the dishes have been allowed to soak in this manner for at least 30 minutes, they are individually taken from this area, and, using the manipulator a dish-holding attachment, are individually washed in a soap water bath and rinsed. After drying, they are placed in the dish storage module.

The system also cleans the attachable cooking tools as well as the system's own cleaning tools. In the preferred embodiment, this will occur in a soapy bath and a rinse accompanied by blown-air based drying.

Window Cleaning

In the preferred embodiment, the FPS is equipped with a system for cleaning the interior surface of the viewing window. It consists of an ultraviolet light which is shone on the window that has a thin layer of titanium dioxide particles coating its interior surface. The reaction that ensues causes any organic materials stuck to the window to break down. After the ultraviolet light is applied, the window is rinsed with distilled water.

Ultra-Violet Cleaning and Sterilization System

In another embodiment, the entire system is bathed in ultraviolet light to kill mold and bacteria and keep the interior sterile. A smaller transportable ultraviolet light (11400) is periodically directed by the primary manipulator to sterilize areas that are not reached by the main system ultraviolet light.

In embodiments in which surfaces of the interior of the cooking area are coated with enamel, TiO2 pigment is embedded in the enamel to allow UV light to break down organic substances attached to it and be rinsed away.

The primary manipulator uses UV light for cleaning itself. A TiO2 pigment in its finish causes a reaction with any organic materials stuck to it which are then rinsed off. In one embodiment, the primary manipulator cleans most of itself using the high-pressure spray tool. Rinsing of the extreme end would occur in the tool and dish cleaning basins.

Video Camera Cleaning

The lenses of the video cameras are also coated with a thin layer of TiO2 for UV light-based cleaning. In one embodiment, the video cameras lenses are mounted behind a flat window, and a movable wiper is provided to keep the window clean and steam-free during the cooking process.

Control System Overview

The control subsystem is configured to store:
the current location of all FPS tools;
the current location and quantity of stored ingredients;
the food preferences of the users whose profiles have been programmed;
the current status of all dishes being prepared;
the current location and status of all precooked ingredients and leftover ingredients.

The control subsystem has a main controller with interfaces with the other parts of the device such as the cooking receptacle power control unit, the storage unit controls, primary manipulator, and the Internet.

The control system has a scheduler for scheduling system resources to optimally complete all requested dishes at the time requested by the user. The scheduling algorithm can employ a genetic algorithm or use other scheduling algorithms. These are commonly used in logistics scheduling and factory scheduling.

The scheduler optimizes the order of preparation steps in order to produce dishes of the highest quality and have them ready at the requested time while using the least amount of energy and other resources.

The control system controls the venting of cooking fumes to the outdoors. In the preferred embodiment, it adjusts the speed of the fan or fans based on its estimate of the volume of fumes being generated according to what is being cooked and the types of fumes expected. An "electronic nose" may be used to monitor the gases being produced by the cooking food and use that information to guide the cooking process.

The control system can take orders for food and prepare it immediately or schedule it for later preparation. The control system may be configured to cook ingredients for the next day's meals after cooking dinner to minimize cleanup and energy required, if desired.

The control system may utilize the computational resources of at least one personal computer connected to the food preparation system over (a network cable or over and a wireless network connection). The control system offloads some of the computation-intensive tasks such as the vision system to the remote personal computer. The food preparation system has the resources for most tasks to accomplish by itself but can be assisted with extra computational resources for computationally-intense tasks or to perform special operations.

The device is configured to pre-cook certain ingredients such as beans and stocks which are prepared before actual use in a dish and then stored in the refrigerated storage module. The control system is configured to remember which pre-made ingredient is stored and where so it may be retrieved efficiently later when needed.

Cooking Control Programs

The recipes or cooking control programs for each dish describe how it is prepared. Based on the number of servings requested, the cooking program is customized for that amount. The cooking programs contain information such as:
- when a dish can be held (temporarily suspended) during preparation, and how to hold it
- which steps can be performed in parallel (simultaneously)
- a range of options to customize it for users' various tastes
- a list of the ingredients
- the cooking times and steps
- alternate preparation options for various steps
- "Hint" information on how the different control parameters change with quantity
- presentation and serving information
- other recommended complementary dishes
- possible ingredient substitutions Cooking Program Development The control system can operate as part of a distributed genetic algorithms to optimize the cooking program for a specific dish. In this situation, a large group of food preparation devices would all prepare the same dish, with slightly different cooking programs, and collect ratings from the respective users on the taste and quality of each dish. These ratings would be used to produce a new set of varied cooking programs for the dish to be cooked and tested, genetically combined, and thereafter the preparation of that dish would tend toward the optimum in terms of taste. The process could be coordinated by a central server, or could be done on a distributed basis with all of the cooking devices communicating with each other. This would result in better recipes without excess effort and testing on the part of a human cooking expert and could go on continuously for users who don't mind rating the food.

Paying for Recipes

The system is configured so that recipes are loaded from the Internet onto the system or purchased at a store in machine-readable format. These recipes not only include how to make the dish, but include how to present the food and can be completely designed by a professional chef. The most expensive recipes are single, limited edition recipes, made by professional chefs. The machine would decrypt the recipe and execute it but not allow it to be stored or reused.

Cooking Control

The control system is set according to the altitude of the device location and is capable of reading current weather conditions from a selection of (remote server, remote weather station, the Internet). Barometric pressure and humidity are used to adjust the cooking programs for optimal results.

If the user desires a dish requiring deep-frying, the control system maintains a memory within the control system of how long a particular batch of oil has been used in the deep-frying system or in the shallow-frying system. It maintains a complete history of the oil and when it is deemed unhealthy or unpalatable for use in frying at which time it is discarded automatically. While the oil is not being used for frying, it is maintained at a cool temperature using the cooling system in a cooking receptacle utilizing the ability of the cooking receptacle to be cooled by flowing chilled water through its cooling jacket. The oil life calculation is based partly on a combination of experience, user feedback and preference, and scientific predictions.

Low-Level Algorithms Development

The control system is configured to operate a distributed optimization of low level functionality by communicating information to other devices on low-level algorithms such as breaking eggs, mixing, scooping, washing, and other low-level activities in order to optimize the operation of those tasks.

In one embodiment, this process is instigated and controlled by the manufacturer of the FPS. Owners of an individual FPS may sign up to allow their machines to be used for algorithm development. Whenever a particular control algorithm was used, the speed, efficiency, and effectiveness of that variation of the algorithm is measured and that data is used as part of a distributed genetic algorithm or other optimization scheme to improve the control algorithm.

User Interface

The user-interface consists of a natural speech interface, a touch screen, a mouse interface, or a combination these. In the preferred embodiment, the interface is a combination of a touch screen with natural speech (voice recognition?). The user tells the device what he or she wants, and it makes it. The device also use a Internet interface in the preferred embodiment, so users may log-in remotely to check what the device recommends based on levels of ingredients in storage in order to schedule a meal.

The control system may present a list of suggested dishes to the user for selection or surprise the user by selecting at least one dish to make without any user intervention. In one embodiment, illustrations of the proposed dish may be viewed.

The control system can also offer the user a list of possible dishes it could make and include a flag by the dishes which will use the most ingredients which are most likely to go bad soon and therefore should be used quickly.

The control system can also communicate with a remote server that contains information about other users who have food taste preferences similar to those of the present user. The users provide a list of favorite dishes that their FPS has made. The remote server then returns a list of suggested dishes based on what people who have similar tastes also like.

The user may input a set of preferred ingredients, and an internal expert system built into the control system creates a dish using expert knowledge based on those ingredients.

Multiple Users

Where the device is configured to support multiple economically distinct users, ingredients are tracked according to which belong to a specific user and which ingredients are owned commonly by all users. The common ingredients are billed to each user based on usage. The users generate credit for purchasing the ingredients which then they can use up when the FPS utilizes those ingredients. The ingredients include dry foodstuffs, dairy products, spices and herbs, and meats. The cooking device can be located in a condominium with multiple units and each unit would have access to the device. Practically, no more than four or five users could have easy access to the device. This way, the cost of the device can be shared among several people, and the control system facilitates this by maintaining detailed cost data.

Cooking Programs

The device has the ability to communicate cooking programs, in machine-readable form, to other users and food preparation devices via the Internet or other means of digital communication allowing a user to send favorite dishes to friends, family, and colleagues.

The control system has the ability log the use of copyrighted cooking programs and total up the fees due to the owner of a copyrighted cooking program.

Resupply of Ingredients

The control system has a database that stores the amount of each ingredient that has been used and combines that information with visual and other measurements of the ingredient storage containers and evaluates it against the planned menus to determine which ingredients need to be restocked and when. It can print a printed shopping list for the user or send an electronic order to a market that offers delivery, or send an electronic order to the mobile market on a truck. It also uses future planned menus and typical usage patterns to determine how much of various ingredients to order.

The device control system, in conjunction with the user, plans a certain number of meals over the next season, and device calculates the vegetable and meat requirements for such meals, and places orders to small organic farms, larger farms or produce suppliers. This allows farms to plant exactly the food that will be required and reduce waste and increase efficiency.

Human Intervention

There are two primary ways humans can assist in the cooking process. One is by performing a step that the FPS cannot handle mechanically such as making egg rolls. Another is when a human must assist the device to perform an action that is too complex for the control system to manage.

In one embodiment, the cooking programs are configured to allow for human user assistance, at the appropriate place the program, the user is notified by a cell phone call, audio alarm, or page and is given prompts on the video display or by audio instruction as to what to do. A user could also be notified by e-mail that contains instructions on performing the required task. The user performs the task, then notifies the FPS that a task is finished, and the device continues with the process.

The most expensive option is where the machine is configured for remote operation and a professional chef operates the machine in real-time. Most of the operations would most likely be downloaded cooking programs chosen by the chef to make the base ingredients of the meal. Certain touches such as the garnish, the recipes downloaded, the layout of the food on the plate, will be directly controlled by the remote chef. This would be much more expensive for the user than a standard, free, downloaded cooking program. In this mode, it would not be possible for the user to record or reuse the recipe because of the extensive human operation of the device and the proprietary nature of the chef's involvement.

Routine Human Assistance

There will likely be times when the FPD runs into a problem that it cannot resolve using the control system. Examples might be if a tool falls off and the PM is unable to pick it up or if some problem occurs with food being prepared that the control system is unable to resolve. At such a point, the control system has two options. It can call the user and get help. However, in the preferred embodiment, it calls a service center staffed with people whose job it is to help multiple FPS with problems. The service center staff checks out the problem remotely using the information transmitted over a digital communications link including live video from the video cameras on the PM and in the FPS. The staff can take manual control of the primary manipulator and other FPS systems to resolve the problem. If it is a serious problem that requires an on-site human helper, the service center staff can either contact the user to instruct the user on the proper solution, or dispatch a technician to correct the problem onsite.

Stock Making

Stock, a broth made by boiling food ingredients in water, is traditionally made in large batches. This is to save labor and for flavors to marinate over time. However, the FPD has excess labor available at little cost for ingredients which may be prepared ahead of time. This can be accomplished overnight, or at times during the day when there is time open on a cooking receptacle and the food preparation area.

The control system can make stock ahead of time and store it in the refrigerated storage areas either liquid or frozen. In many cases, if the menu is known in advance, the stock can be made fresh immediately prior to the dish that requires it. To skim scum that floats to the surface during the stock cooking process, a attachable suction tool can be employed.

Manual Mode

In the preferred embodiment, the system has a manual mode, in which ingredients from the outside can be simply cooked, grilled, fried, baked, or boiled. The user presses the manual mode button, or in preferred embodiment, activates the manual mode verbally and provides the food to be processed in a container or on a plate. The machine takes the container, removes the food and cooks it. This allows the machine to replace all of the appliances in the typical kitchen since the user can make use of all the cooking resources within the machine. It can also wash a dish or several dishes and utensils. This allows the FPD to function as a simple stove, oven, and possibly dishwasher, in addition to its normal role preparing complete dishes in automated mode.

Drivers

New attachable tools are supplied with machine readable software that instructs the control system on how the device is operated.

Dishware Storage System

In the preferred embodiment, table dishware is stored in a dishware storage system. Plates and bowls are stored on edge in a rack on a rotating carousel which allows the primary manipulator to have individual access to them. The storage system also functions as a drying rack after the dishes are washed.

FIG. 76 is an cut-away pictorial view of the dishware storage system. As depicted the dishware storage system (14000) includes a rotating carousel (14005), a motor (14010) to drive the carousel, a rack (14015) to hold dishware (14016) on edge, an access door (14020) for the primary manipulator, a service access panel (14025) to the outside of the enclosure, and a fan (14030) to speed drying of the dishware. Excess water passes out through the drain (14035). The control system operates the motor (14010) to drive the carousel to the degree of rotation required to access the required dish. The primary manipulator is utilized to retrieve or replace the dishes onto the rack (14015) through the access door (14020).

Dishes are retrieved from the dishware storage system by the primary manipulator with a attachable dish grasping tool which is a mechanical gripper covered with a non-slip coating. In the food preparation area, cooked food is placed on the dishes and then presented to the user to be served. After the meal, the user returns the dishes to the system through the dish and food transfer area. The dishware is washed, partially dried, and replaced in the rotating carousel to complete the drying process. It remains stored there until needed again.

The optional dishware storage system provides increased convenience to the user by being able to store dishes that are not completely dry. In one embodiment, the dishes are color-coded, with a strip around the rim or edge of the dish, to allow an optical recognition system to more easily identify each dish type. The strips could be dashed, or could be of different colors for different dishes.

In instances where more people must be served than the FPS has serving dishes, the user may place dishes stored outside the FPS into the dish and food transfer area to be loaded with food.

Dish and Food Transfer Area

The dish and food transfer area is a primary interface point between the FPS and the user. It is the area from which completed dishes of food and dishware are retrieved after their preparation by the device and where dirty dishware is returned to the device after its use for cleaning and storage.

Less expensive models of the food preparation system could simply serve the food in large bowls or pots, or place it on a dish the user places in the system, and would not place the food on individual plates or store or wash dishes.

FIG. 77 is a pictorial view of the dish and food transfer area. As depicted, the dish and food transfer area (15000) is shown in relationship to the main cabinet of the FPS. The dish and food transfer area is accessible by the primary manipulator within the FPS as well as the users from the outside.

FIG. 78 is a pictorial view of the dish and food transfer area with an open door. As depicted the dish and food transfer area (15000) comprises, an external access door (15010), removable trays (15016), and dishware (15001). Dishes with food ready to be served are place on a removable tray for access by the users.

FIG. 79 is a side cut-away view of the dish and food transfer area. As depicted the dish and food transfer area comprises an internal access door (15005), an external access door (15010), shelves (15015) to accommodate the removable trays, heating elements/heat lamps (15020), and heating/cooling elements (15025). The prepared dish and its associated serving dishware are placed by the manipulator onto trays which are in turn placed on the shelves of the dish and food transfer area. As needed, dishes can be kept warm or kept cool by the heating lamps or heating/cooling elements prior to serving as they sit on their trays on the shelves. The trays of food and dishware can then be removed by the user. The trays are re-used for dirty dishware when the user returns it to the device for washing and storage. The system monitors the humidity as well as temperature, to hold food at an ideal environment prior to being served, so it does not dried out or get too cold.

While the invention has been described in the specification and illustrated in the drawings with reference to a main embodiment and certain variations, it will be understood that these embodiments are merely illustrative. Thus those skilled in the art may make various substitutions for elements of these embodiments, and various other changes, without departing from the scope of the invention as defined in the claims. Therefore, it is intended that the invention not be limited to the particular embodiment illustrated by the drawings and described in the specification as the best mode presently contemplated for carrying out this invention, but that the invention will include any embodiments falling within the spirit and scope of the appended claims.

What is claimed is:

1. A food preparation system comprising:
a housing comprising a wall having a surface;
a control subsystem configured to control a plurality of food preparation processes capable of preparing a meal comprising a variety of foods based on user selection of the foods;
a plurality of ingredient storage containers comprising dry ingredient storage containers and liquid ingredient storage containers;
a storage module configured to store the ingredient storage containers and a variety of ingredients contained within the ingredient storage containers for an extended period;
an ingredient manipulator configured to access and remove a plurality of ingredients from the ingredient storage containers, as commanded by the control subsystem;
a cooking receptacle disposed within the housing, the cooking receptacle being configured to cook ingredients placed therein by the ingredient manipulator;
a dish and food transfer area that comprises an internal access door, an external access door, and shelves for trays; and
a cleaning subsystem configured to clean the cooking receptacle and the surface of the wall of the housing.

2. The food preparation system recited in claim 1, further comprising a central food preparation and cooking module with attachable modular components selected from a group consisting of: oven compartment module, grill module, refrigerated ingredient storage module, non-refrigerated ingredient storage module, greenhouse module, dishware storage module, dish and food transfer module, and dummy module.

3. The food preparation system recited in claim 1, wherein the ingredient manipulator is further configured to use an attachable tool.

4. The food preparation system recited in claim 1, wherein the cooking receptacle has a configuration selected from the group consisting of: fixed-in-place configuration, fixed-in-place with a removable liner configuration, and tiltable fixed-in-place configuration.

5. The food preparation system recited in claim 1, wherein the cooking receptacle comprises an electric heating element to provide heat to the contents of the cooking receptacle.

6. The food preparation system recited in claim 1, wherein the cooking receptacle comprises a lid that is pivotable between an open position to enable access to ingredients within the cooking receptacle and a closed position to enable greater control of the environment within the cooking receptacle and to prevent introduction of contaminants to the cooking receptacle.

7. The food preparation system recited in claim 1, further comprising external connections to couple to one or more of: water mains, wastewater disposal system, electrical system, internet.

8. The food preparation system recited in claim 1, further comprising a trash compartment configured to store trash generated during the food preparation process.

9. The food preparation system recited in claim 1, wherein the storage module comprises a rotating circular shelf on which the ingredient storage containers are stored.

10. The food preparation system recited in claim 1, wherein the storage module is further configured to maintain the ingredients stored in the ingredient storage containers at refrigerated temperatures.

11. The food preparation system recited in claim 1, wherein the ingredient storage containers are selected from the group consisting of: small meat and vegetable storage containers, reusable dry ingredient storage containers, viscous ingredient storage tubes, and small powdered spice containers.

12. The food preparation system recited in claim 1, further comprising environmental sensors selected from the group consisting of: a hyper-spectral sensor, a multi-spectral digital imager, a video sensor, an audio sensor, a temperature sensor, and a humidity sensor.

13. The food preparation system recited in claim 1, further comprising a dishware storage module configured to store dishes and utensils.

14. The food preparation system recited in claim 1, wherein the dishware storage module comprises a rack positioned on a rotating carousel, the rack being configured to store dishes on edge.

15. The food preparation system recited in claim 1, wherein the cleaning subsystem is also configured to clean attachable tools associated with the food preparation system.

16. The food preparation system recited in claim 1, wherein the cleaning subsystem is controlled by the control subsystem.

17. A food preparation system comprising:
a housing comprising a wall having a surface;
a control subsystem configured to control a plurality of food preparation processes capable of preparing a meal comprising a variety of foods based on user selection of the foods;
a plurality of ingredient storage containers comprising dry ingredient storage containers and liquid ingredient storage containers;
a storage module configured to store the ingredient storage containers and a variety of ingredients contained within the ingredient storage containers for an extended period;
an ingredient manipulator configured to access and remove a plurality of ingredients from the ingredient storage containers, as commanded by the control subsystem;
a cooking receptacle disposed within the housing, the cooking receptacle being configured to cook ingredients placed therein by the ingredient manipulator;
a cleaning subsystem configured to clean the cooking receptacle and the surface of the wall of the housing,
wherein the control subsystem is further configured to optimize recipe quality by:
obtaining taste ratings from users through a user interface for recipes prepared using the food preparation system,
communicating the recipe and user taste ratings with other food preparation systems that have prepared similar recipes and receiving ratings from other users,
varying the recipe by combining different variations of highest rated versions of the recipe the next time the recipe is prepared, and
repeating the process each time the recipe is prepared to improve the recipe.

18. A food preparation system comprising:
a housing comprising a wall having a surface;
a control subsystem configured to control a plurality of food preparation processes capable of preparing a meal comprising a variety of foods based on user selection of the foods;
a plurality of ingredient storage containers comprising dry ingredient storage containers and liquid ingredient storage containers;
a storage module configured to store the ingredient storage containers and a variety of ingredients contained within the ingredient storage containers for an extended periods;
an ingredient manipulator configured to access and remove a plurality of ingredients from the ingredient storage containers, as commanded by the control subsystem;
a cooking receptacle disposed within the housing, the cooking receptacle being configured to cook ingredients placed therein by the ingredient manipulator;
a cleaning subsystem configured to clean the cooking receptacle and the surface of the wall of the housing; and
a rotating attachable tool rack configured to hold attachable tools for use by the ingredient manipulator.

19. A food preparation system comprising:
a control subsystem configured to control a plurality of food preparation processes capable of preparing a meal comprising a variety of foods based on user selection of the foods;
a plurality of ingredient storage containers comprising dry ingredient storage containers and liquid ingredient storage containers;
a storage module configured to store the ingredient storage containers and a variety of ingredients contained within the ingredient storage containers for an extended period;
an ingredient manipulator configured to access and remove a plurality of ingredients from the ingredient storage containers, as commanded by the control subsystem;
a cooking receptacle configured to cook ingredients placed therein by the ingredient manipulator;
a cleaning subsystem configured to clean the cooking receptacle utilizing water; and
a rotating attachable tool rack configured to hold attachable tools for use by the ingredient manipulator.

20. The food preparation system recited in claim 19, further comprising a dish and food transfer area that comprises an internal access door, an external access door, and shelves for trays.

21. A food preparation system comprising:
a housing comprising a wall having a surface;
a control subsystem configured to control a plurality of food preparation processes capable of preparing a meal comprising a variety of foods based on user selection of the foods;
a plurality of ingredient storage containers comprising dry ingredient storage containers and liquid ingredient storage containers;
a storage module configured to store the ingredient storage containers and a variety of ingredients contained within the ingredient storage containers for an extended period;
an ingredient manipulator configured to access and remove a plurality of ingredients from the ingredient storage containers, as commanded by the control subsystem;
a cooking receptacle disposed within the housing, the cooking receptacle being configured to cook ingredients placed therein by the ingredient manipulator; and
a cleaning subsystem configured to clean the cooking receptacle and the surface of the wall of the housing, the cleaning subsystem comprising cleaning tools operated by a cleaning manipulator.

22. The food preparation system recited in claim 21, wherein the cleaning manipulator and the ingredient manipulator are integrated into a same device.

* * * * *